US012057029B2

(12) United States Patent
Groves et al.

(10) Patent No.: US 12,057,029 B2
(45) Date of Patent: Aug. 6, 2024

(54) MOBILE GAS TECHNICIAN TRAINING LAB

(71) Applicant: Grid Manufacturing Corporation, Meridian, ID (US)

(72) Inventors: Mark James Groves, Boise, ID (US); Aaron Howell, Boise, ID (US); Dean Coriell, Indian Valley, ID (US); Phillip Lee Carrillo, Boise, ID (US); Richard Gene Wilson, Meridian, ID (US); Ian Chase Richards, Moon Township, PA (US); Vincent Delmar Kubichek, Port Orange, FL (US); Philip Bradley-Gil Scarberry, Spring, TX (US); Lawrence M. Krummert, Ellwood City, PA (US)

(73) Assignee: QUANTA ASSOCIATES, L.P., Houston, TX (US)

( * ) Notice: Subject to any disclaimer, the term of this patent is extended or adjusted under 35 U.S.C. 154(b) by 807 days.

(21) Appl. No.: 17/146,309

(22) Filed: Jan. 11, 2021

(65) Prior Publication Data

US 2021/0390880 A1 Dec. 16, 2021

Related U.S. Application Data

(60) Provisional application No. 63/038,508, filed on Jun. 12, 2020.

(51) Int. Cl.
*G09B 19/00* (2006.01)
*B43L 1/00* (2006.01)
*B60P 3/00* (2006.01)
*B62D 53/08* (2006.01)
*G09B 19/24* (2006.01)

(52) U.S. Cl.
CPC ............... *G09B 19/24* (2013.01); *B43L 1/00* (2013.01); *B60P 3/00* (2013.01); *B62D 53/08* (2013.01)

(58) Field of Classification Search
CPC .............................. G09B 19/00; G09B 19/003
USPC ......................................... 434/219, 226, 234
See application file for complete search history.

(56) References Cited

U.S. PATENT DOCUMENTS

| | | | | |
|---|---|---|---|---|
| 4,337,048 A * | 6/1982 | Hatch | .................. | G09B 9/00 434/224 |
| 4,526,548 A * | 7/1985 | Livingston | ............. | G09B 19/00 434/226 |
| 5,173,052 A * | 12/1992 | Duncan, Jr. | ............ | G09B 19/00 296/168 |

(Continued)

FOREIGN PATENT DOCUMENTS

WO WO-2013000019 A1 * 1/2013 ........... A62C 99/009
WO WO-2014177880 A2 * 11/2014 ......... A62C 99/0081

*Primary Examiner* — Kurt Fernstrom
(74) *Attorney, Agent, or Firm* — Knobbe Martens Olson & Bear LLP

(57) ABSTRACT

Mobile training labs for training gas technicians are disclosed. The mobile training labs can include a towable trailer comprising a body having a plurality of walls at least partially defining a hollow interior, an axle having at least two wheels disposed thereon to support the body, and a tow hitch. The mobile training labs can also include at least one training bay connected to the towable trailer such that the at least one training bay is configured to be accessed from an exterior of the towable trailer. The at least one training bay can include a work bench and a mock service entrance that is representative of a commercial or residential gas service entrance.

17 Claims, 22 Drawing Sheets

(56) References Cited

U.S. PATENT DOCUMENTS

| | | | | |
|---|---|---|---|---|
| 5,679,003 A * | 10/1997 | Schwechel | ............ | G09B 19/00 |
| | | | | 434/226 |
| 5,752,835 A * | 5/1998 | Whitmer, Sr. | ............ | G09B 9/00 |
| | | | | 434/226 |
| 6,048,208 A * | 4/2000 | Hoover | ................ | G09B 23/188 |
| | | | | 434/226 |
| 6,799,975 B1 * | 10/2004 | Dunn | ..................... | G09B 19/00 |
| | | | | 434/226 |
| 7,008,230 B2 * | 3/2006 | Hoglund | ................ | G09B 19/00 |
| | | | | 434/236 |
| 7,074,043 B1 * | 7/2006 | Jacobson | ............... | G09B 19/00 |
| | | | | 434/226 |
| 7,244,123 B1 * | 7/2007 | Barron | ..................... | G09B 9/00 |
| | | | | 434/366 |
| 7,901,212 B2 * | 3/2011 | Quinn | ................ | A62C 99/0081 |
| | | | | 434/226 |
| 8,585,410 B2 * | 11/2013 | Nielsen | .................. | G09B 19/00 |
| | | | | 434/219 |
| 8,622,744 B2 * | 1/2014 | Lumry | ................... | G09B 25/02 |
| | | | | 434/226 |
| 8,888,495 B2 * | 11/2014 | Johnson | ................... | G09B 5/06 |
| | | | | 434/219 |
| 10,388,176 B2 * | 8/2019 | Wallace | ................... | G09B 5/06 |
| 2006/0240392 A1 * | 10/2006 | Clifton | ............... | A62C 99/0081 |
| | | | | 434/226 |
| 2009/0042173 A1 * | 2/2009 | Jaszlics | .................. | G09B 19/00 |
| | | | | 29/592 |
| 2012/0144762 A1 * | 6/2012 | Eatock | ................... | G09B 19/00 |
| | | | | 52/79.5 |

* cited by examiner

MOBILE GAS TECHNICIAN TRAINING LAB

BACKGROUND

Field

This application relates to training gas (or other types of) technicians, and more particularly, to a mobile gas technician training lab.

Description

Working with flammable gases, such as natural gas, can be dangerous. Gas technicians must be carefully trained to be able install and repair gas lines and meters so that the installations and repairs can be made without injury, harm, or damage.

SUMMARY

This application relates to mobile training labs that are configured for providing training for gas (or other types of) technicians. In some instances, the word "training" is used herein to refer to training (e.g., providing instruction) and/or testing (e.g., providing a test and evaluating the results thereof). As will be described in detail below, the mobile training labs can include one or more training bays or other devices, systems, or areas configured for practical or hands-on training. The mobile training labs may also include a classroom or other areas configured for written or computer-based training. Additionally, the mobile training labs can include storage spaces for storage of tools, consumables, and other equipment used for the training.

In a first aspect, a mobile training lab for training gas technicians is described. The mobile training lab can include a towable trailer comprising a body having a plurality of walls at least partially defining a hollow interior, an axle having at least two wheels disposed thereon to support the body, and a tow hitch. The mobile training lab can also include at least one training bay connected to the towable trailer such that the at least one training bay is configured to be accessed from an exterior of the towable trailer. The at least one training bay can include a first lateral wall, a second lateral wall, and a rear wall connecting the first and second lateral walls, as well as a work bench disposed between the first and second lateral walls and comprising a work surface. The at least one training bay can also include a mock service entrance comprising one or more gas connection points positioned on the rear wall of the at least one training bay, wherein the mock service entrance is representative of a commercial or residential gas service entrance.

The mobile training lab can include one or more of the following features in any combination: (a) wherein the at least one training bay further comprises at least one of a power source, and a compressed air source; (b) wherein the at least one training bay comprises at least one removably mounted pipe vice; (c) wherein the at least one removable pipe vice is mounted on a post, and the at least one training bay comprises a channel configured to receive the post to removably mount the pipe vice to the at least one training bay; (d) wherein the at least one training bay comprises a removably mounted pipe holder; (e) wherein the removably mounted pipe holder is mounted on a plate, and the at least one training bay comprises a slotted receptacle configured to receive the plate to removably mount the pipe holder to the training bay; (f) wherein the at least one training bay comprises at least a first training bay and a second training bay, and a mock service entrance of the first training bay is differently arranged than a mock service entrance of the second training bay; (g) wherein a gas connection point of the first training bay is positioned at a first location on the rear wall of the first training bay, and a gas connection point of the second training bay is positioned at a second location on the rear wall of the second training bay, wherein the second location does not correspond to the first location; (h) wherein the at least one training bay comprises at least a first training bay and a second training bay positioned adjacent to the first training bay, and a moveable partition is configured to extend outwardly between the first training bay and the second training bay; (i) wherein the moveable partition comprises a whiteboard; (j) wherein the at least one training bay comprises eight training bays, and a first four of the eight training bays are positioned on a first lateral side of the towable trailer and a second four of the eight training bays are positioned on a second lateral side of the towable trailer; (k) at least one of: a compressor, a portable fusion machine, and a portable band saw; (l) wherein the hollow interior of the body comprises a storage area; (m) wherein the hollow interior of the body further comprises a classroom; (n) a gas relight station; (o) wherein the gas relight station comprises a mobile cart configured to support one or more tables, one or more gas burners, and a gas supply fluidly connectable to the one or more gas burner; (p) wherein the one or more tables are mounted on rails such that the one or more tables can extend away from the mobile cart during testing or training and can collapse in toward the mobile cart for storage; and/or other features as described throughout this application.

In another aspect, a method for training gas technicians is described. The method can include transporting a mobile training lab to a training location, the mobile training lab comprising at least one training bay configured for use during training of gas technicians; providing a practical test to a gas technician using the at least one training bay; and evaluating results of the practical gas test.

The method may also include one or more of the following features in any combination: (a) wherein transporting the mobile training lab to the training location comprises towing the mobile gas training lab behind a vehicle; (b) wherein the practical test comprises performing a fusion weld at the at least one training bay using a fusion machine stored in the mobile training lab; (c) wherein evaluating the results of the practical test comprises destructively testing the fusion weld using a moveable band saw stored in the mobile training lab; (d) wherein evaluating the results of the practical test comprises pressure testing the fusion weld using compressed air from a compressor stored in the mobile training lab; (e) wherein the practical test comprises plumbing between a sample distribution line and a mock service entrance, wherein the mock service entrance is representative of a residential or commercial gas service entrance; (f) providing a written or computer-based test in a classroom of the mobile training lab; (g) training or testing of a gas technician using the mobile training lab, wherein the training or the testing comprises at least one of: main installation including pressure testing, running a service line off of a main including tapping and pressure testing, MSA construction including leak, lock and flow testing, customer fuel line assembly including pressure testing, steel tapping and stopping training, fusion training, Operator Qualification certification, locating training, corrosion and cathodic protection training, purging of mains and service lines with or without inert gas injection, and gas relight training; and/or other features as described throughout this application.

The systems, methods and devices of this disclosure each have several innovative aspects, no single one of which is solely responsible for the desirable attributes disclosed herein.

BRIEF DESCRIPTION OF THE DRAWINGS

The features and advantages of the devices, systems, and methods of the mobile training labs for training gas technicians described herein will become more fully apparent from the following description and appended claims, taken in conjunction with the accompanying drawings. These drawings depict only several embodiments in accordance with the disclosure and are not to be considered limiting of its scope. In the drawings, similar reference numbers or symbols typically identify similar components, unless context dictates otherwise. The drawings may not be to scale.

DETAILED DESCRIPTION

Disclosed herein are embodiments of mobile training labs (e.g., training units or training modules) for training gas technicians (or others). The mobile training labs can be configured to provide training and/or testing related to a wide variety of concepts and skills that are needed for working with dangerous and/or flammable gases, such as natural gas, for example.

As an initial example, mobile training labs as described herein can be configured to provide training and/or testing related to Operator Qualification (OQ) of gas technicians. Due to the noted dangers of working with some gases, federal and state laws and/or other regulatory or industry organizations may require gas technicians to obtain an OQ prior to performing certain gas installations and repairs. OQ is intended to reduce the likelihood of human error or damage to person or property during gas technician work. Obtaining an OQ generally includes training for and passing a test. The test can include both a written (e.g., hand written or computer-based) component as well as a practical or hands-on component.

Previously, gas technicians seeking to obtain an OQ often needed travel to an OQ training and testing location. Such OQ training and testing locations are generally not widely available, however, which limits and restricts access. This creates problems as gas technicians seeking to obtain an OQ often must travel far distances in order to reach the facilities. In some instances, obtaining an OQ may require multiple days, further increasing the cost of obtaining an OQ as hotels or other travel accommodations must be made. Due to the difficulties associated with obtaining an OQ or other types of related training and testing, an improved solution is desired.

The mobile training labs described herein can provide this solution. As will be described below in detail, a mobile training lab can be configured to provide written and/or practical training and testing in a mobile platform. The mobility of the training lab can allow the training lab to be brought to the gas technicians, increasing access and availability to necessary training and OQ while reducing costs. Advantageously, the mobile training lab can be easily transported to various training locations. Bringing the mobile training lab to the gas technicians can greatly reduce the cost and required travel for the gas technicians.

Detailed descriptions of several embodiments of mobile training labs for training gas technicians shown in the figures are provided below. These embodiments are provided by way of example and are not intended to be limiting. Modifications, variations, combinations, etc., are possible and within the scope of this disclosure.

Figure 1:
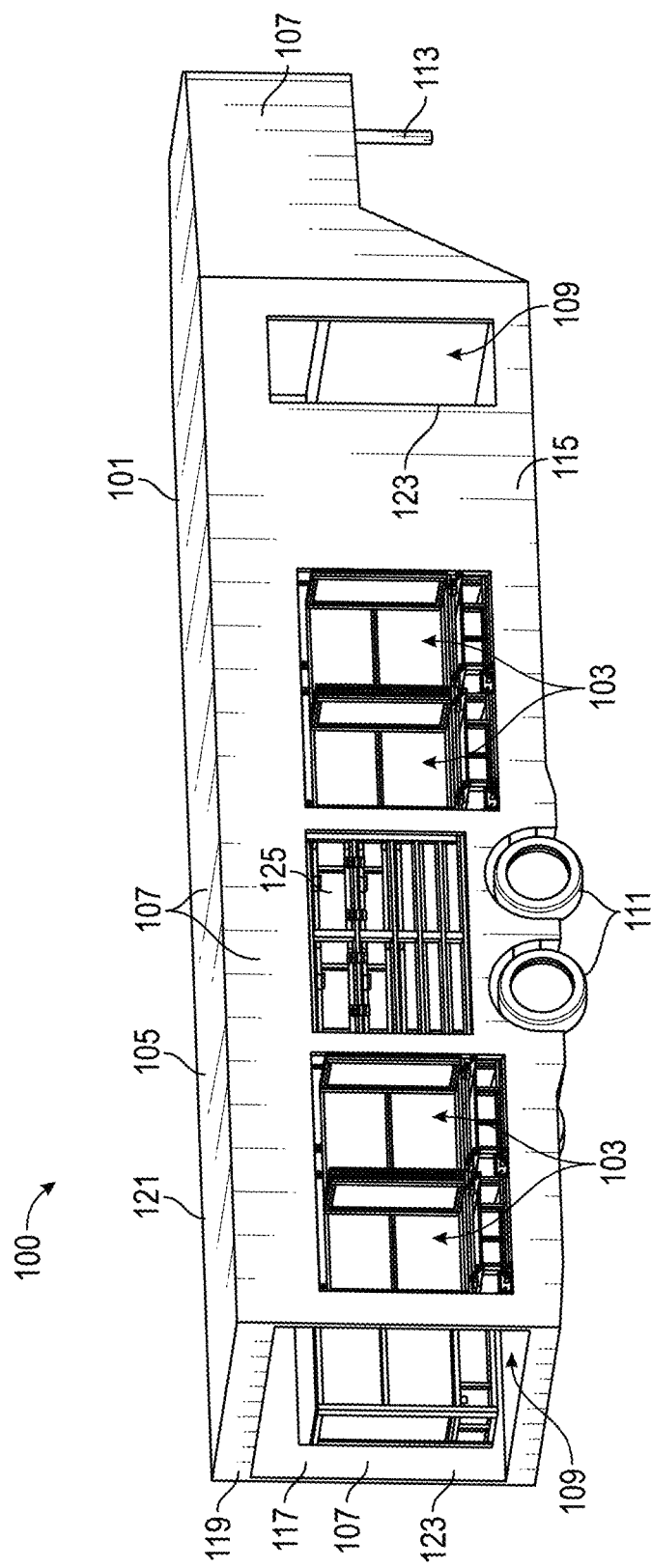
FIG. 1 is a perspective view of an embodiment of a mobile training lab for training gas technicians.

FIG. 1 is a perspective view of an embodiment of a mobile training lab 100. The mobile training lab 100 can be configured to provide various types of training and/or testing. In some embodiments, such as will be described in the examples provided herein, the mobile training lab 100 can be configured for providing training and/or testing for gas technicians. The term "gas technicians" is used herein broadly to refer to people that, among other things, perform installations and repairs of gas service, such as natural gas service, for example. It should be appreciated that the mobile training labs 100 described herein can also be configured to provide training and/or testing for other types of users as well as in other contexts.

In the illustrated embodiment, the mobile training lab 100 includes a trailer 101 configured with training bays 103 (e.g., work bays, work stations, work benches, etc.). The trailer 101 is configured to be portable (e.g., moveable) such that the mobile training lab 100 can easily be transported to different locations for training and/or testing. The mobility of the trailer 101 advantageously allows the mobile training lab 100 to be moved different locations so as to increase the access of gas technicians to training and/or testing. Rather than requiring the gas technicians to go to a physical training or testing location, the trailer 101 can be brought to the gas technicians. As one example, the trailer 101 can be transported to a worksite (e.g., a location at which gas service is to be installed or repaired) to provide training and/or testing to the gas technicians working at the worksite. The training bays 103 can be disposed, positioned, or connected to the trailer 101. The training bays 103 can be configured to be used during practical training and/or testing.

As illustrated in FIG. 1, the trailer 101 can include a body 105 having a plurality of walls 107, a hollow interior 109, wheels 111, a tow hitch 113, and one or more external storage areas 125. In the illustrated embodiment, the trailer 101 is configured as an enclosed gooseneck trailer, although this need not be the case in all embodiments. Other types of trailers may also be used. The plurality of walls 107 of the body 105 can include a right lateral wall 115, a left lateral wall 117, a rear wall 119, and a roof 121. In the illustrated embodiment, four training bays 103 are positioned on or connected to the right lateral wall 115 and four training bays 103 (not visible in FIG. 1) are similarly positioned on or connected to the left lateral wall 117. Other configurations are also possible. For example, all of the training bays 103 can be positioned on or connected to the same wall (e.g., all training bays 103 can be positioned on the right lateral wall 115). As another example, training bays 103 can, in some embodiments, be positioned on or connected to other walls 107 of the trailer 101, such as the rear wall 119.

The plurality of walls 107 can be arranged so as to define the hollow interior 109 of the trailer 101. The hollow interior 109 can be configured to, for example, provide storage areas for various items and/or to provide training and/or testing locations. Example interior storage areas will be described below with reference to FIGS. 2-4 and 15. Example interior training and/or testing locations will be described below with reference to FIGS. 2, 3, and 14. As illustrated in FIG. 1, one or more of the plurality of walls 107 can include access locations 123 (e.g., apertures, holes, doorways, access points) to allow access to the hollow interior 109. In the illustrated embodiment, a first access location 123 is provided in the right lateral wall 115 and a second access location 123 is provided in the rear wall 123. Other numbers of access locations 123 and different configurations or locations for the access locations 123 are also possible. Although not illustrated in FIG. 1, the access locations 123 can be provided with doors, such that they can be opened and closed.

The body 105 of the trailer 101 may further comprise structural components such as a frame and/or chassis configured to support the plurality of walls 107 and other components of the trailer 101. As shown in FIG. 1, the trailer 101 includes the wheels 111 to facilitate movement and transport of the trailer 101. The wheels 111 may be mounted on one or more axles as will be appreciated by those of ordinary skill in the art. In the illustrated embodiment, the trailer 101 comprises two axles, each with a wheel 111 on each lateral side of the trailer 101. Other numbers of axles and wheels 111 may be used as appropriate to support the weight of the trailer 101.

The trailer 101 further can include the tow hitch 113. The tow hitch 113 can be configured to allow the trailer 101 to be attached to another vehicle, such as a truck, tractor, SUV, etc. Thus, the trailer 101 can be a towable trailer configured to be towed behind another vehicle. In the illustrated embodiment, the tow hitch 113 is configured as a gooseneck hitch, although other types of hitches are possible. For example, the tow hitch 113 can be a bumper pull hitch. In some embodiments, the trailer 101 can include its own engine (gas, diesel, or electric powered) so that the mobile lab 101 can be moved/transported without the use of an additional vehicle.

The trailer 101 may also include any necessary components for driving on public roads, such as turn signals, brakes, mirrors, etc., and can be customized to include some or all of these features as necessary. In some embodiments, the trailer 101 can include legs extending downwards in an extended position. These legs may be adjustable in height and may end in a foot, providing for further stability to the trailer 101. The legs may fold up to the underside of the trailer 101 in a retracted position. In some embodiments, the legs may be retractable and/or telescopic. The legs may be locked in their extended and/or retracted positions. Further, lights can be used on an exterior and/or interior surface of the trailer 101 to provide illumination for individuals who may be operating in nighttime.

In some embodiments, the trailer 101 can be approximately 42 feet long, although other lengths are possible. The trailer 101 can be configured such that, when towed by a vehicle, the total length of the trailer 101 and the vehicle is 65 feet or less. Other lengths, both shorter and longer than 42 or 65 feet, for the trailer 101 or the trailer 101 and the vehicle are also possible. In some embodiments, the trailer 101 can have a weight capacity of at least or greater than 10,000, 11,000, 12,000, 13,000, 14,000, 15,000, 16,000, 17,000, 18,000, 19,000, or 20,000 pounds. In some embodiments, the trailer 101 can be approximately 6, 7, 8, 9, 10, 11, 12, 13, 14, 15, 16, 17, 18, 19, or 20 feet in height. The above dimensions and weight capacities for the trailer 101 are provided by way of example, and other shapes, dimensions, and weight capacities can be used as well as appropriate. In some preferred embodiments, the trailer 101 can be configured such that it can be towed on public roads and highways without requiring special permitting or consideration.

As noted above, the mobile training lab 100 also includes training bays 103. The training bays 103 can be configured to be used during training and/or testing. In some embodiments, the training bays 103 are configured to be used during practical or hands-on training and/or testing of gas technicians.

As illustrated in FIG. 1, the training bays 103 can be positioned on, disposed on, formed in, or connected to the body 105 or walls 107 of the trailer 101. For example, in the illustrated embodiment, the training bays 103 are connected to the trailer 101 at or near the right and left lateral walls 115, 117. Further, as shown in FIG. 1, the training bays 103 can be positioned such that they are configured to be accessed from an exterior of the trailer 101. That is, in some embodiments, a user using a training bay 103 may stand outside of the trailer 101 in front of the training bay 103. Although not illustrated in FIG. 1, the training bays 103 can also be configured with doors or covers, such that the training bays 103 can be selectively closed.

In the illustrated embodiment, the mobile training lab 100 includes eight training bays 103. In FIG. 1, however, only four of the training bays 103 are clearly visible, with four similar training bays 103 positioned on an opposite lateral side of the trailer 101 (not visible in FIG. 1). Further, while the mobile training lab 100 is currently illustrated with eight training bays 103, other numbers of training bays 103 can be included in other embodiments. For example, the mobile training lab 100 can include one, two, three, four, five, six, seven, eight, nine, ten, or more training bays 103.

Example training bays 103 will be described in more detail below with reference to FIGS. 5-13.

FIG. 1 also illustrates that the mobile training lab 101 can include one or more externally-accessible storage areas 125. Such storage areas 125 can be configured for storage of various items, such as items that will be used at the training bays 103 during training and/or testing. Items that will be used at the training bays 103 during training and/or testing may also be stored within the hollow interior 109 of the trailer or at the training bays 103 themselves.

In the illustrated embodiment, the mobile training lab 100 includes two external storage areas 125, with one positioned on each of the right lateral wall 115 and the left lateral wall 117 (not visible in FIG. 1). The external storage areas 125 may comprise one or more cabinets, chests, drawers, recesses, etc., configured for storage of items. In some embodiments, the external storage areas 125 can comprise toolboxes. In some embodiments, doors or covers may be provided to selectively cover the storage areas 125.

The mobile training lab 100 can be wired for power. For example, power may be available at one or more of the training bays 103 as described in more detail below. In some embodiments, the power for the mobile training lab 100 may be provided from an external source, such as the tow vehicle or a separate generator. In some embodiments, a power source, such as a generator or one or more batteries can be provided on or in the mobile training lab 100 to provide power. In some embodiments, power is provided from the two vehicle.

Figure 2:
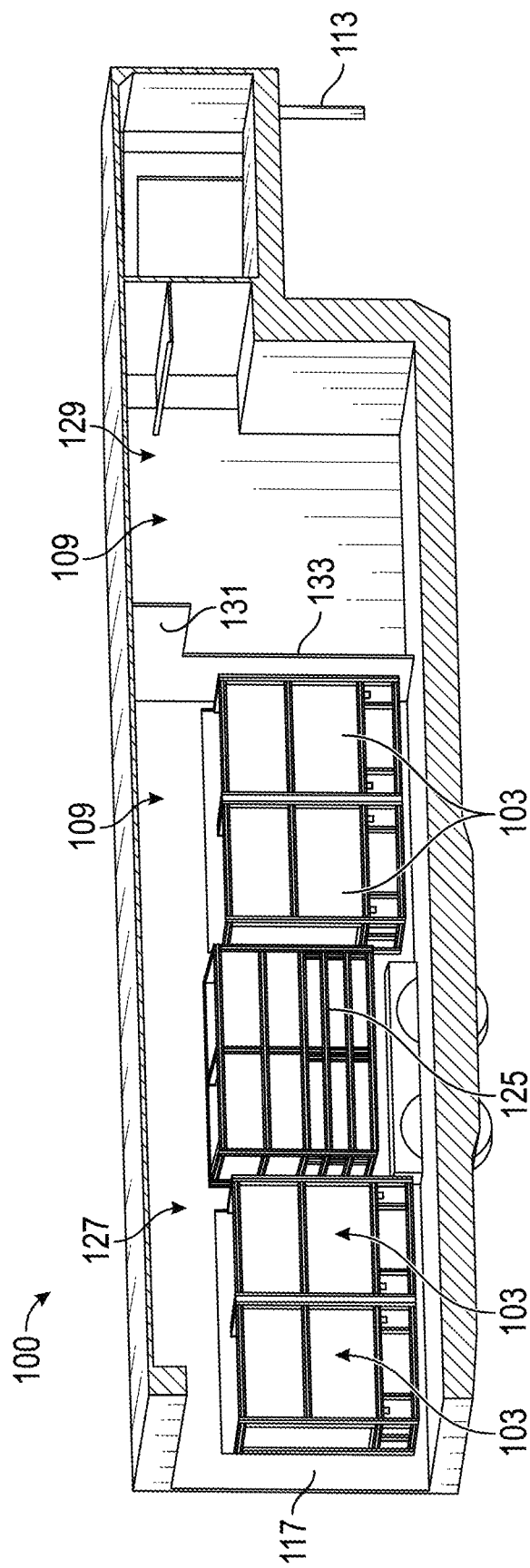
FIG. 2 illustrates a longitudinal cross-sectional view of the mobile training lab of FIG. 1.

FIG. 2 illustrates a longitudinal cross-sectional view of the mobile training lab 100 of FIG. 1 so as to better visualize the hollow interior 109 of the trailer 101. As shown in FIG. 2, for some embodiments, the training bays 103 and/or storage areas 125 may extend partially into the hollow interior 109 of the trailer 101. Other configurations are also possible.

Figure 3:
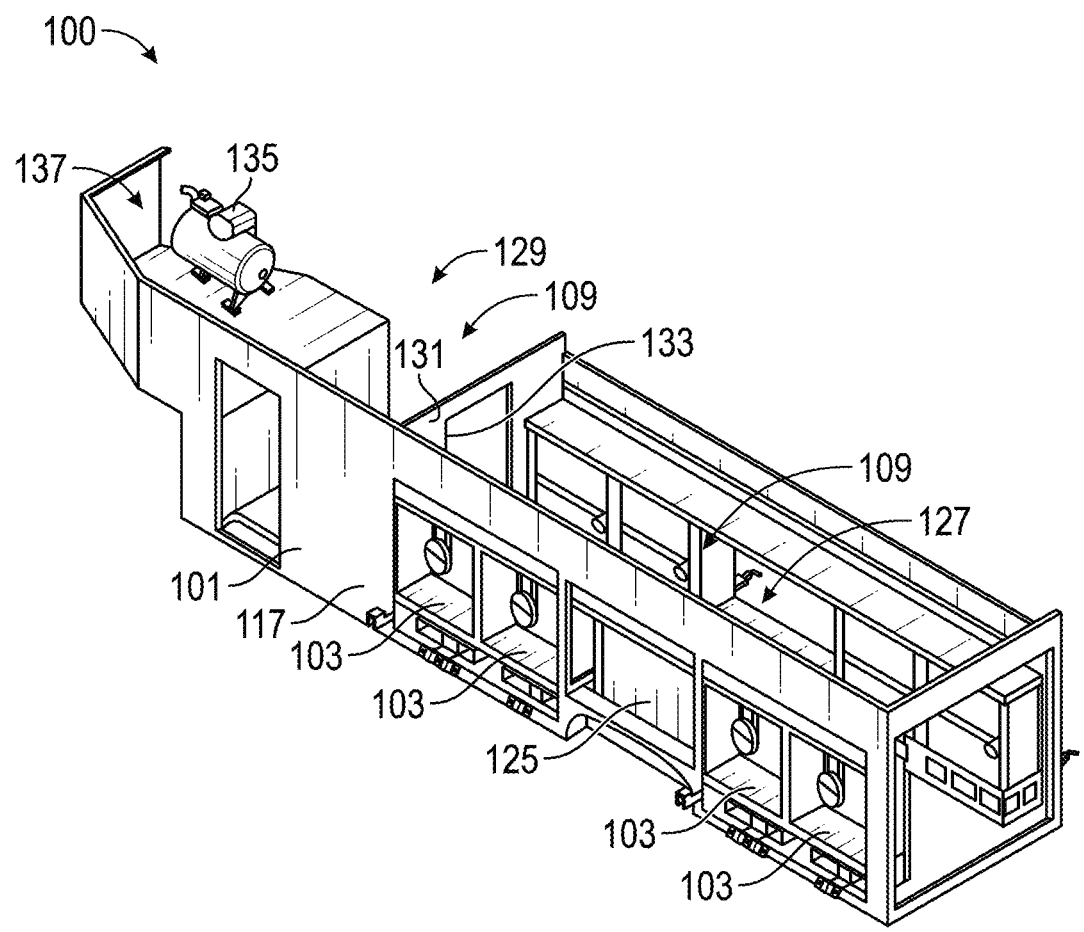
FIG. 3 is a perspective view of the mobile training lab of FIG. 1 illustrated with a roof and a portion of exterior walls removed.

In the illustrated embodiment of FIG. 2 (and as also shown in FIG. 3), the hollow interior 109 can be divided into two general rooms, spaces, or areas. For example, in the illustrated embodiment, the hollow interior 109 includes an internal storage area 127 and a classroom 129. In the illustrated embodiment, the hollow interior 109 includes an internal storage area 127 generally positioned at the rear of the trailer 101 and a classroom 129 generally positioned near, at, or towards the front of the trailer 101. The internal storage area 127 can be configured in the hollow interior 109 of the trailer 101 between the training bays 103. The internal storage area 127 will be described in more detail below with reference to FIGS. 4 and 15. The classroom 129 can be configured to provide a space for written or computer-based testing and/or training. In some embodiments, the classroom 129 is configured with tables, chairs, etc. The classroom 129 will be described in more detail below with reference to FIG. 14.

As shown in FIG. 2, the internal storage area 127 and the classroom 129 can be separated by an interior wall 131. The interior wall 131 may include an access location 133 (e.g., an aperture, hole, or doorway) to allow access between the internal storage area 127 and the classroom 129. In some embodiments, the access location 133 can be provided with a door or other cover such that the access location 133 can be selectively closed.

FIG. 3 is a perspective view of the mobile training lab 100 illustrated with a roof and a portion of exterior walls removed so as to visualize the hollow interior 109 of the trailer 101. Similar to FIG. 2, FIG. 3 illustrates that the hollow interior 109 can be divided into an internal storage area 127 and a classroom 129, which can be separated by an interior wall 131 including an access location 133. Although FIGS. 2 and 3 illustrate an embodiment that includes the interior storage area 127 positioned at the rear of the trailer 101 and the classroom 129 positioned near the front of the trailer 101, other configurations are also possible. For example, the interior storage area 127 could be positioned at or near the front of the trailer 101 and the classroom 129 could be positioned at or near the rear of the trailer 101. Further, while the illustrated embodiment shows the hollow interior 109 divided into two rooms or spaces, other numbers of rooms or spaces may also be used. For example, the hollow interior 109 may include one, two, three, four, or more rooms or spaces, each of which can be configured for various purposes.

FIG. 3 also illustrates that the mobile training lab 100 may include a source of compressed air, such as a compressor 135. In the illustrated embodiment, the compressor 135 is positioned in an enclosure 137 positioned near the front of the trailer 101. As illustrated, the compressor 135 is positioned generally over the tow hitch 113. Other locations for the compressor 135 are also possible, such as within the hollow interior 109, including within the internal storage area 127 or classroom 129. The compressor 135 may provide a source of compressed air for the mobile training lab 100. The compressed air may be used during training and/or testing. For example, the compressed air may be used to pressure test lines and check welds or fusions of pipes for leaks. Additionally, the compressed air may be used to power air tools. As will be described below, one or more of the training bays 103 may be configured with compressible air sources. The compressible air sources of the training bays 103 can be pneumatically connected to the compressor 135. In some embodiments, other sources of compressed air, such as pressurized tanks, can be used in addition to or in place of the compressor 135.

Figure 4:
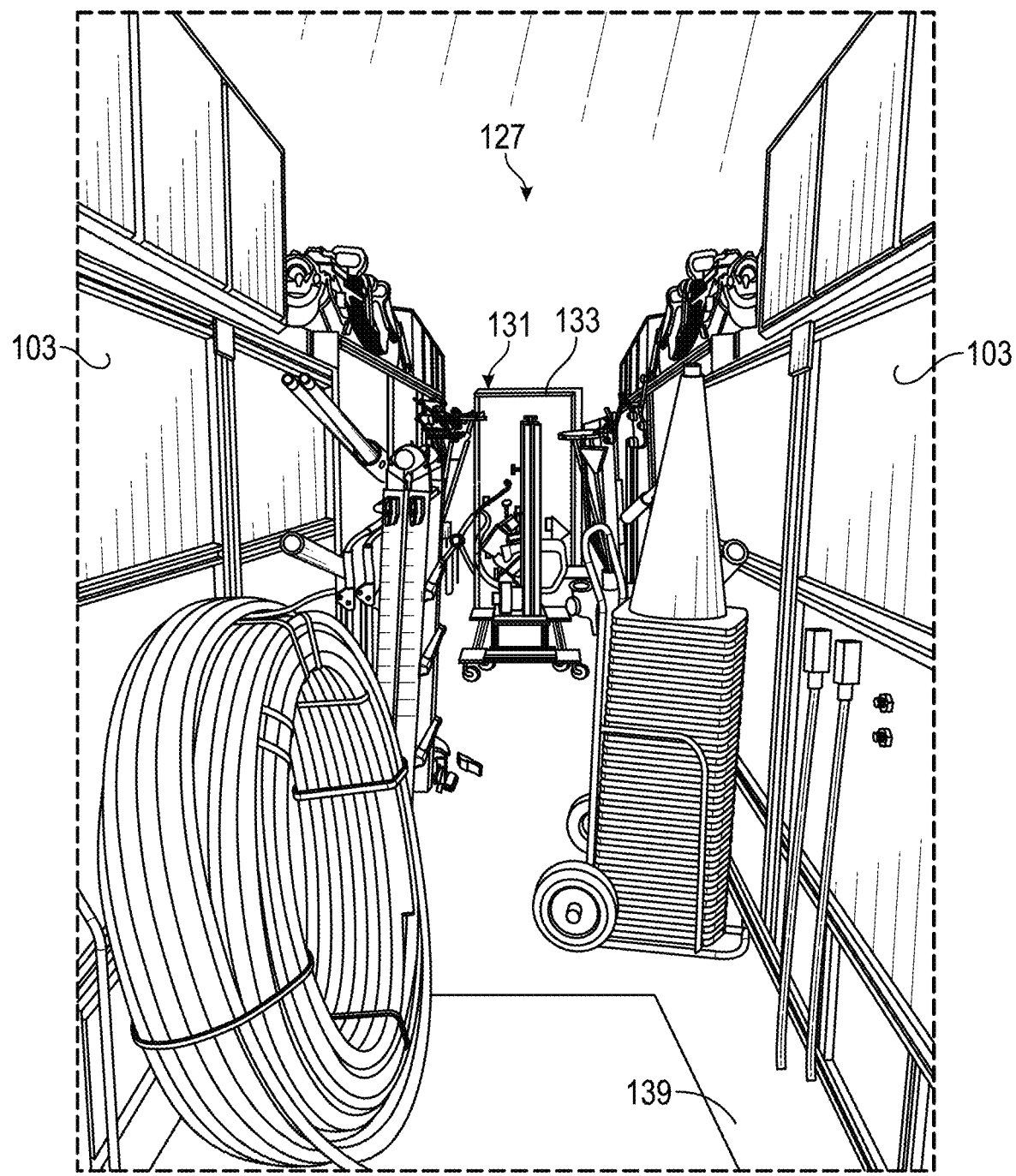
FIG. 4 is a perspective view of an embodiment of an interior storage area of the mobile training lab of FIG. 1.

FIG. 4 is a perspective view of the interior storage area 127 of the mobile training lab 100 according to one embodiment. The view of FIG. 4 is from the access location 123 in the rear wall 119 of the trailer 101 (e.g., from the back of the trailer 101 looking into the trailer 101). As mentioned before, the training bays 103 can extend partially into the hollow interior 109 of the trailer 101. The interior storage area 127 may be formed as a space or corridor between the training bays 103. A floor 139 of the interior storage are 127 may be provided. The floor 139 provides a surface on which to walk and on which items can be stored. FIG. 4 also illustrates the interior wall 131 and access location 133 leading to the classroom 129.

Figure 5:
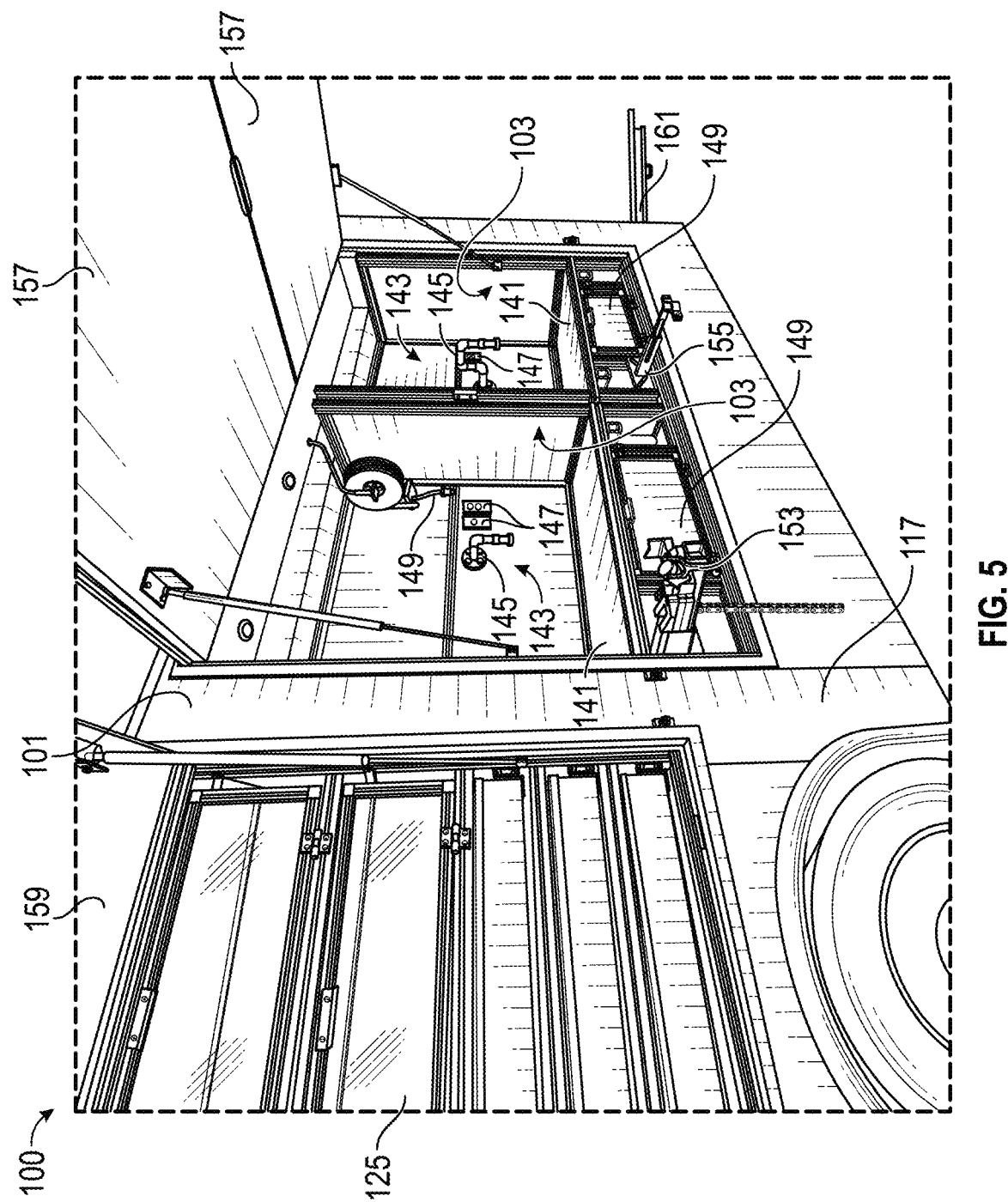
FIG. 5 is a perspective view of two training bays of the mobile training lab of FIG. 1, according to an embodiment.

FIG. 5 is a perspective view of two training bays 103 of the mobile training lab 100. In the illustrated embodiment, the two training bays 103 are positioned on or connected to the left lateral wall 117 of the trailer 101. The illustrated training bays 103, however, may be representative of any or all of the training bays 103 of the mobile training lab 100. As noted above, the training bays 103 can be configured for use during practical training and/or testing of gas technicians. That is, the training bays 103 can be configured to provide a location at which practical gas training and/or testing can occur. Further, the training bays 103 can be configured to be externally accessible, such that a user stands outside of the mobile training lab 100 and in front of one of the training bays 103 during use. In some embodiments, each training bay 103 is configured for use by a single user. In some embodiments, one or more training bays 103 can be configured for use by multiple users.

In the illustrated embodiment, each training bay 103 includes a work bench 141, a mock service entrance 143 including one more gas connection points 145, one or more power sources 147, a compressed air source 149, and a storage box 151. These features will be described in more detail below with reference to FIG. 6, which illustrates a single training bay 103. Further, FIG. 5 illustrates one of the training bays 103 with a pipe vice 153 attached thereto and one of the training bays 103 with a pipe holder 155 attached thereto. These features will be described in more detail below with reference to FIGS. 6-7.

FIG. 5 also illustrates embodiments of covers or doors 157, 159, 161 for selectively covering or closing the training bays 103, external storage area 125, and rear access location 123, respectively. In the illustrated embodiment, each training bay 103 is provided with a door 157 that can be opened and closed. In some embodiments, a single door 157 may be configured to open and close more than one training bay 103. For example, a single door 157 can be configured to cover both training bays 103 illustrated in FIG. 5.

As shown in FIG. 5, for some embodiments, the doors 157 that are configured to cover the training bays 103 can be attached to the training bays 103 (or otherwise to the trailer 101) at a location above or proximal to the top of each training bay 103. This can allow the doors 157 to advantageously pivot upward in order to open. Such a configuration can be advantageous as it both moves the doors to a position that does not obstruct access to the training bays 103 when open and also provides some cover, shade, or shelter for users that are using the training bays 103 (e.g., users standing in front of the training bays 103). The door 159 that is configured to cover the external storage area 125 may be similarly configured so as to open by pivoting upward as shown. Of course, other configurations for the doors 157, 159 are possible. For example, doors 157, 159 may open by hinging to the right, left, or down, or doors 157, 159 may comprise roll top doors configured to roll up and retract into the trailer 101. Other types of doors 157, 159 are also possible.

FIG. 5 also illustrates an embodiment of the door 161 configured to selectively close the rear access location 123. In the illustrated embodiment, the door 161 is configured to hinge from the bottom of the rear access location 123. This configuration advantageously allows the door 161 to serve as a ramp into the hollow interior 109 of the trailer 101 when the door 161 is open. Other embodiments and configurations for the door 161 are also possible.

Figure 6:
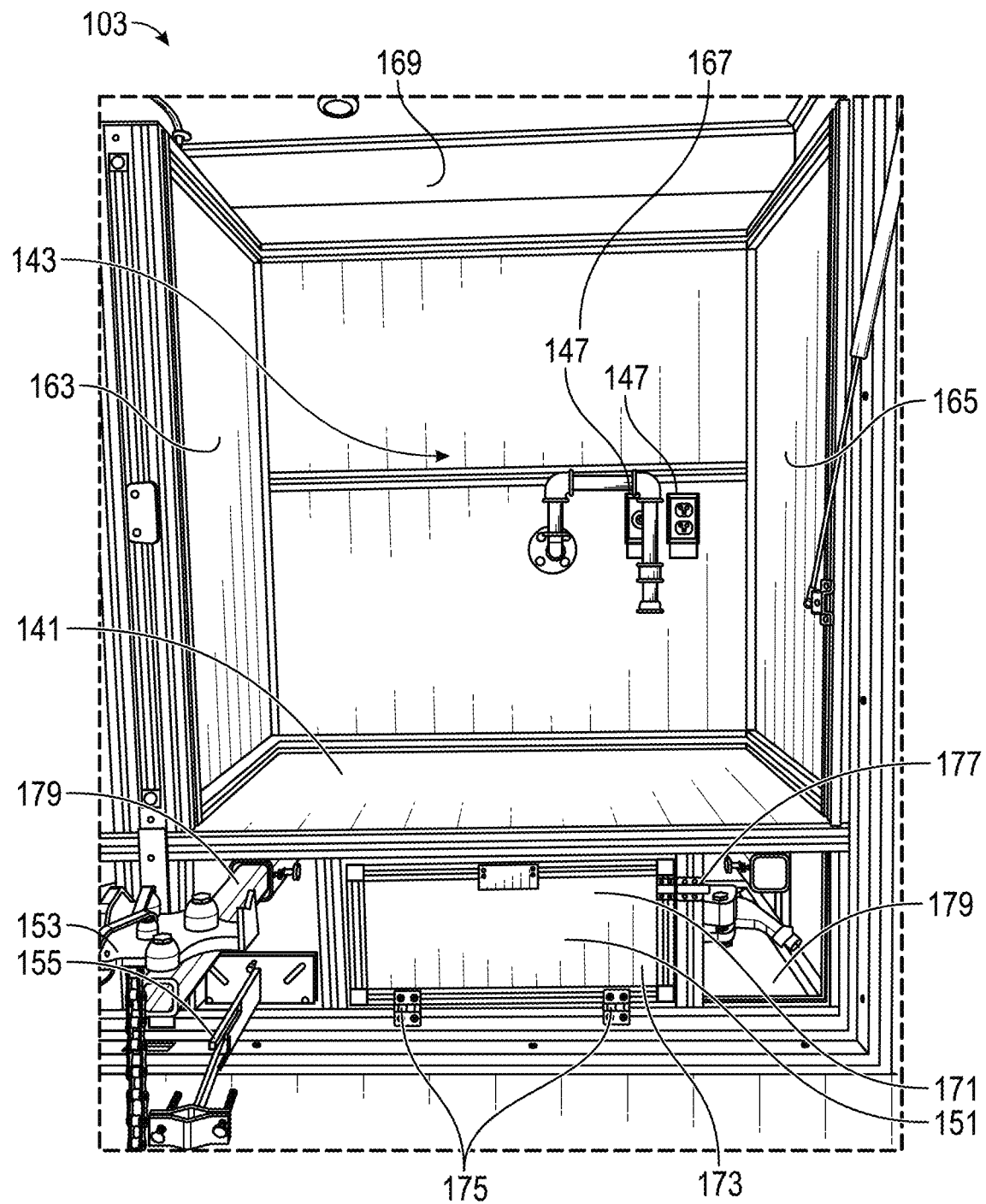
FIG. 6 is a front view of one of the training bays of FIG. 5.

FIG. 6 is a front view of one of the training bays 103 of the mobile training lab 100 according to an embodiment. The description of the training bay 103 illustrated in FIG. 6 may be representative of any or all of the training bays 103 of the mobile training lab 100. In the illustrated embodiment of FIG. 6, the training bay 103 includes a first lateral wall 163, a second lateral wall 165, a rear wall 167, the work bench 141, the mock service entrance 143 including one more gas connection points 145, the one or more power sources 147, the compressed air source 149 (not shown in FIG. 6, but visible in FIG. 5, for example), the storage box 151, the pipe vice 153, and the pipe holder 155. The illustrated configuration is, however, merely provided by way of example, and other configurations for the training bay 103 are possible. In some embodiments, one or more of the illustrated and/or described features of the training bay 103 can be omitted and/or additional features or different arrangements of the features are possible.

As shown in FIG. 6, the training bay 103 can comprise a recessed or partially recessed shape. In the illustrated embodiment, the recessed shape 103 is formed by the first lateral wall 163, the second lateral wall 165, and the rear wall 167. The first and second lateral walls 163, 165 can extend generally from one of the lateral walls 107 of the trailer 101 towards the interior of the trailer 101. That is, an outer edge of the first and second lateral walls 163, 165 can be proximal or substantially even (e.g., within 1, 2, 3, 4, 5, or 6 inches) with the lateral wall 107 of the trailer 101, while an inner edge of the first and second lateral walls 163, 165 can be recessed back from the lateral wall 107 of the trailer 101. As shown in FIG. 6, the rear wall 167 can extend between and connect the inner edges of the first and second lateral walls 163, 165. This recessed configuration can provide a space in which users can work during the training and/or testing provided using the training bay 103.

Additionally, the work bench 141 can be provided to give a work surface on which to work. As shown in FIG. 6, in the illustrated embodiment, the work bench 141 is disposed between the first and second lateral walls 163, 165. For example, lateral edges of the work bench 141 can be connected to the first and second lateral walls 163, 165. An outer edge of the work bench 141 can be proximal or substantially even with (e.g., within 1, 2, 3, 4, 5, or 6 inches) the lateral wall 107 of the trailer 101, while an inner edge of the work bench 141 can be recessed back from the lateral wall 107 of the trailer 101 as shown. In the illustrated embodiment, the outer edge of the work bench 141 can be connected to the rear wall 167. Example dimensions for the work bench 141, the first and second lateral walls 163, 165, and the rear wall 167 will be described below.

As noted above, the work bench 141 can provide a work surface that can be used during training and/or testing at the training bay 103. For example, during training or testing of a gas technician, the gas technician may use a fusion machine to fuse together two pipes. The work surface of the work bench 141 be configured, for example, to support the fusion machine during this process. Accordingly, the work bench 141 can comprise a substantially flat and rigid surface on which to work. In some embodiments, the work surface of the work bench 141 comprises an aluminum deck, although other materials may also be used in other embodiments.

The training bay 103 can also be configured with the mock service entrance 143, as shown, for example, in FIG. 6. In the illustrated embodiment, the mock service entrance 143 is formed on the rear wall 167 of the training bay 103. Thus, in some embodiments, the mock service entrance 143 is positioned just behind the work bench 141 such that a user standing in front of the training bay 103 can easily access both the work bench 141 and the mock service entrance 143.

The mock service entrance 143 can be configured to be representative of a commercial or residential gas service entrance. The mock service entrance 143 can be configured to simulate or otherwise have the appearance (and/or function) of a commercial or residential gas service entrance so as to be useful during training and/or testing of gas technicians. The mock service entrance 143 can include one or more gas connection points 145. The one or more gas connection points 145 may be representative of gas connection points on a commercial or residential building. The gas connection points 145 can be configured to simulate or otherwise have the appearance (and/or function) of gas connection points at a commercial or residential building so to be useful during training and/or testing of gas technicians. As will be described in more detail below, for example, during training and/or testing, a gas technician can plumb a gas connection to the gas connection points 145 of the mock service entrance 143. In some embodiments, the gas technician can, during training or testing at the training bay 103, install a gas meter at the mock service entrance 143. In the illustrated embodiment, the gas connection point 145 comprises an arrangement of pipes extending from the rear wall 167 of the training bay 103.

Example dimensions for the training bay 103 will now be provided. These dimensions are provided by way of example and should not be construed as limiting, as other configurations with other dimensions are also possible.

The height of the work bench 141, measured relative to ground (e.g., the surface on which the mobile training lab 100 rests), can be between about 30 inches and about 40 inches or even between about 2.5 feet and 5 feet, such as between about 2.5 feet and 4 feet. In some embodiments, the height of the work bench 141 is about 2.5 feet, about 3 feet, about 3.5 feet, about 4 feet, or about 4 feet. The work bench 141 may have a width, measured from between lateral edges or between the first and second lateral walls 163, 165, can be between about 2 feet and 8 feet, such as between about 3 feet and 7 feet or between about 3 feet and 6 feet. In some embodiments, the width of the work bench 141 is about 2.5 feet, about 3 feet, about 3.5 feet, about 4 feet, about 4.5 feet, or about 5 feet. The work bench 141 may have a depth measured from between inner and outer edges or between the lateral wall 107 of the trailer 101 and the rear wall 167 between about 12 inches and 36 inches, such as between about 12 inches and 24 inches or between about 12 inches and 20 inches. In some embodiments, the depth of the work bench 141 is about 12 inches, about 14 inches, about 16 inches, about 18 inches, about 20 inches, about 22 inches or about 24 inches. In some embodiments, the work bench is 46 inches wide and 22 inches deep.

Moreover, it will be appreciated that the height, width, and depth of the work bench 141 may be configured to optimize the usability and comfort of the training bay 103. For example, the height can be configured such that it is suitable for use by a majority of grown adults. The width and depth of the work bench 141 can be selected to accommodate the actions that will be performed on the work bench 141 during training and testing. For example, when the work bench 141 will be used to support a fusion machine, the width and depth of the work bench 141 can be selected to accommodate the size and shape of the fusion machine as well as to provide sufficient space around the fusion machine to allow comfortable use thereof.

The dimensions of the recessed portion of the training bay 103 may be related to the dimensions of the work bench 141. For example, the depth of the first or second lateral walls 163, 165 may match or be similar to the depth of the work bench 141. Similarly, the width of the rear wall 167 may be equal to or similar to the width of the work bench 141. A height of the first lateral wall 163, the second lateral wall 165, and rear wall 167, measured between the work bench 141 and a top surface 169 of the training bay 103, can be can be between about 4 feet and 8 feet, such as between about 4 feet and 7 feet or between about 5 feet and 6 feet. In some embodiments, the height of the first lateral wall 163, the second lateral wall 165, and rear wall 167 is about 4 feet, about 4.5 feet, about 5 feet, about 5.5. feet, about 6 feet, about 6.5 feet, or about 7 feet. In some embodiments, the height of the height of the first lateral wall 163, the second lateral wall 165, and rear wall 167 may extend from the work bench 141 to within about 6 inches, about 1 foot, about 1.5 feet, about 2 feet, about 2.5 feet, or about 3 feet from the top of the trailer 101.

As described above with reference to FIGS. 1-3, the training bays 103 may extend into the hollow interior 109 of the trailer 101. The depth dimension of the work bench 141 and the first and second lateral walls 163, 165 may relate to the distance into the hollow interior 109 that the training bays 103 extend. Accordingly, this depth dimension can be selected so as to optimize the usability of both the training bays 103 and the hollow interior 109 of the trailer 101. That is, in some embodiments, the depth dimension of the training bays 103 is selected so that the training bays 103 have sufficient space at which to perform training and testing, while still allowing for sufficient useable space within the hollow interior 109 (for storage, for example.).

To facilitate training and testing at the training bay 103, the training bay 103 can include one or more of the following additional features: the one or more power sources 147, the compressed air source 149 (not shown in FIG. 6, but visible in FIG. 5), the storage box 151, the pipe vice 153, and the pipe holder 155.

In the illustrated embodiment, the training bay 103 includes one or more power sources 147. As shown, the power sources 147 can be positioned on a rear wall 167 of the training bay 103, although other locations, such as on the first and second lateral walls 163, 165, on the work bench 141, or elsewhere, for the power sources 147 are possible. In some embodiments, providing the power sources 147 on the rear wall 167 may be advantageous as it can simplify the associated wiring. As shown in FIG. 6, the power sources 147 can comprise electrical outlets. In the illustrated embodiments, the power sources 147 comprise two electrical outlets, one 20-Amp outlet and one 30-Amp outlet. The power sources 147 can be provided to power various tools that can be used during training or testing at the training bay 103. In some embodiments, the voltage/amperages of the power sources 147 can be selected based upon the training and testing that will be performed at the training bay 103. For example, if the training bay 103 is configured for use with a fusion machine, the power sources 147 can be configured to provide appropriate electricity for powering the fusion machine. The power sources 147 can be connected to a generator, or other power source, which as mentioned above, can be positioned on the mobile training lab 100, the tow vehicle, or elsewhere.

Although not visible in FIG. 6, FIG. 5 illustrates that the training bay 103 can include the compressed air source 149. In the illustrated embodiment of FIG. 5, the compressed air source 149 comprises an air hose reel. The air hose reel can include a length of hose sufficient to be useable at the training bay 103. For example, the length of the hose can be at least 5 feet, at least 6 feet, at least 8 feet, at least 10 feet, at least 12 feet, or longer. In some embodiments, one compressed air source 149 can be provided which is accessible by more than one training bay 103. For example, as illustrated in FIG. 5, the compressed air source 149 is positioned generally between the two training bays 103 so as to be useable by either. In some embodiments, each training bay 103 includes its own compressed air source 149. The compressed air source 149 can be supported by, for example, the top wall 169, the rear wall 167, or either of the first and second lateral walls 163, 165. The compressed air source 149 can be pneumatically connected to the compressor shown in FIG. 3, for example.

As shown in FIG. 6, the training bay 103 can include a storage box 151. the storage box 151 can be configured to provide storage for one or more items that can be used at the training bay 103. For example, the storage box 151 can be used for storage of consumables (e.g., tape, cleaning product, etc.), hand tools, struts, and even possibly gas meters and pipes, among other things. For example, the storage box 151 can be configured to hold any pipe vices 151 or pipe holders 155 associated with the training bay 103. In the illustrated embodiment, the storage box 151 is positioned below the work bench 141. Accordingly, a depth (measured from the lateral wall 107 of the trailer 101 towards the interior of the trailer 101) of the storage box 151 may be equal to or similar to the depth of the work bench 141. Although described as a box, the storage box 151 may comprise any suitable shape, including non-cubic and non-rectangular shapes.

In the illustrated embodiment, the storage box 151 comprises a center storage section 171. As illustrated, the center storage section 171 can include a door 173. The door 173 can be configured to selectively close the center storage section 171. In the illustrated embodiment, the door 173 is provided with hinges 175 and a latch 177. On either side of the center storage section 171, the illustrated embodiment includes open storage sections 179. The open storage sections 179 might not include doors, for example, as shown in the illustrated embodiments. The open storage sections 179 may be configured to provide storage and also to provide access to mounting structures for the pipe vices 153 and pipe holders 155.

As shown in FIG. 6, the training bay 103 can include one or more removable pipe vices 153 and/or pipe holders 155. The pipe vices 153 and pipe holders 155 are described in more detail below with reference to FIGS. 7-11. The pipe vices 153 and/or pipe holders 155 can be configured to hold various pipes in position during training or testing at the training bay 103. For example, the pipe vices 153 can be configured to hold plastic or steel pipe for cutting, splicing, threading, and taping. The pipe vices 153 and or pipe holders 155 can be removably mounted to the training bay 103 as described below. When unmounted or unconnected from the training bay 103, the pipe vices 153 and or pipe holders 155 can be stored in the storage box 151 (e.g., in the center storage section 171 or the open storage sections 179).

In some embodiments, one or both of the first and second lateral walls 163, 165 may be configured with a writeable surface, such as a white board or chalkboard. This may allow users to make notes on the first or second lateral walls 163, 165 during training or testing. In some embodiments, the rear wall 167 and/or the work bench 141 may also comprise a writeable surface.

Figure 7:
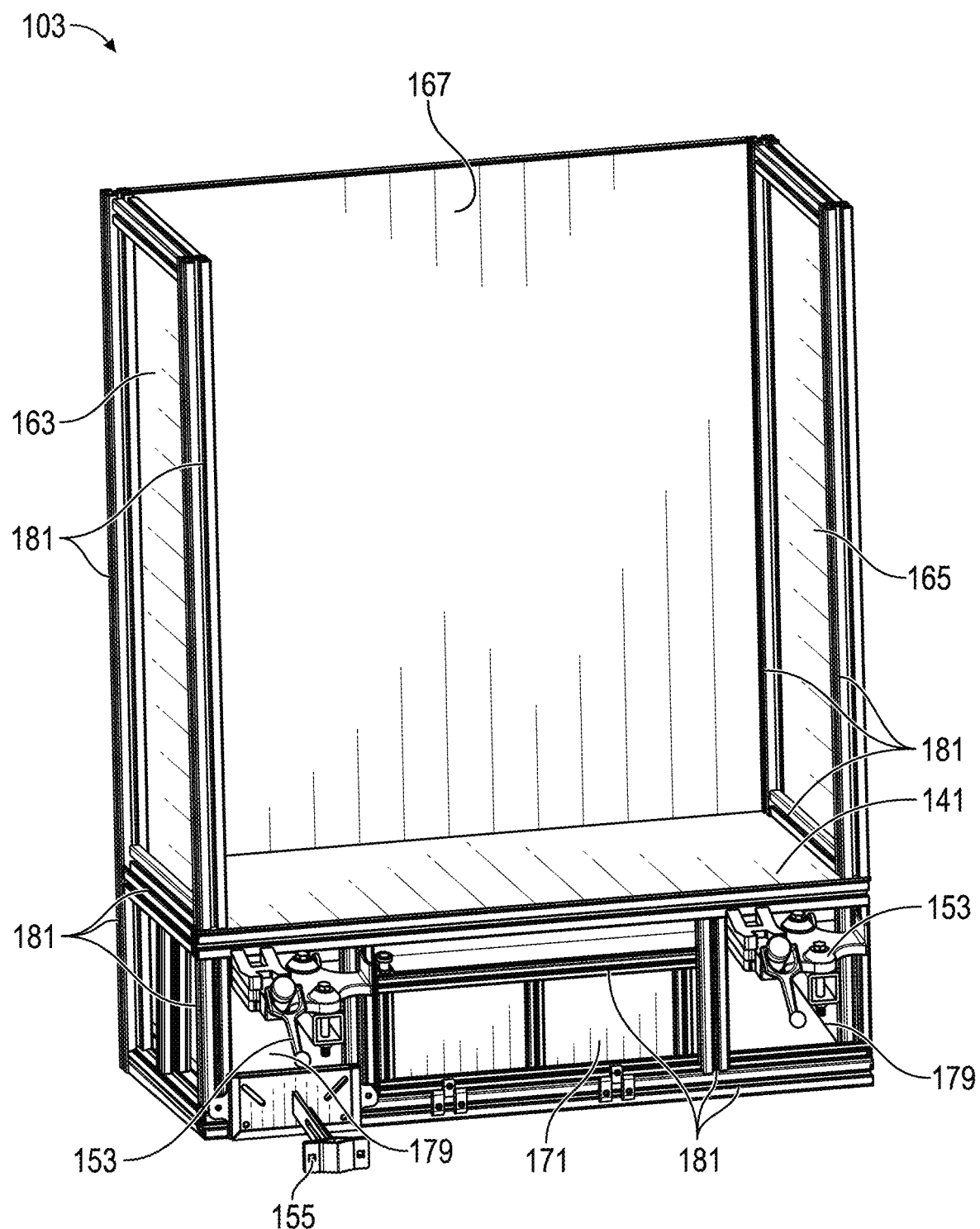
FIG. 7 is a perspective view of a training bay of the mobile training lab of FIG. 1 illustrated removed from the mobile training lab for clarity.

FIG. 7 is a perspective view of a training bay 103 of the mobile training lab 100 illustrated removed from the trailer 101 for clarity. In the illustrated embodiment, the mock service entrance 143 is not shown. FIG. 7 illustrates that the training bay 103 may comprise a frame 181. The frame 181 may provide structural support and rigidity for the training bay 103. In the illustrated embodiment the frame 181 comprises a plurality of frame members connected together. The frame members of the frame 181 may comprise rigid beams or tubes that can be welded or otherwise connected together (e.g., using mechanical fasteners). In some embodiment, such as the illustrated embodiment, the frame members of the frame 181 comprise T-slot bars. Use of T-slot bars may be advantageous as the slot of the bars can provide a simple mechanism for connecting the frame 181 to other components. T-slot bars need not be used in all embodiments, however. The frame 181 may comprise other types of frame members, such as round or square tubing, among others. In some embodiments, the frame 181 comprises aluminum, although other materials may also be used in other embodiments.

The work bench 141 may comprise a panel or sheet that is attached to the frame 181. As noted above, the work bench 141 may comprise an aluminum deck, sheet, or panel. Of course, other suitable materials may be used. Similarly, the first and second lateral walls 163, 165 and the rear panel 167 may also comprise panels or sheets that are attached to the frame 181. The panels or sheets of the first and second lateral walls 163, 165 and the rear panel 167 may be made of the same material as the work bench 141 or different materials. In some embodiments, the rear wall 167 comprises an aluminum sheet. In some embodiments, the first and second lateral walls 163, 165 comprise white boards, chalk boards, or other writable surfaces as mentioned above.

FIG. 7 illustrates the training bay 103 with two removable pipe vices 153 and a removable pipe holder 155 attached thereto. Connections between the removable pipe vices 153, the removable pipe holder 155, and the training bay 103 will be described in more detail below with reference to FIGS. 8-11. FIG. 7 illustrates example placement positions for the removable pipe vices 153 and a removable pipe holder 155 according to one embodiment. In the illustrated embodiment, a first removable pipe vice 153 is attached to the training bay 103 at a top portion of the left (relative to the orientation shown in the figure) open storage section 179. Similarly, a second removable pipe vice 153 is attached to the training bay 103 at a top portion of the right (relative to the orientation shown in FIG. 7) open storage section 179. In these positions, the pipe vices 153 are positioned in proximity to the work bench 141, which may allow the pipe vices 153 to secure pipes that are being worked on with tools on the work bench 141, such as a fusion machine placed on the work bench 141. While FIG. 7 illustrates two pipe vices 153, other numbers may be used, including one, two, three or more pipe vices 153.

FIG. 7 also illustrates an example placement position for the removable pipe holder 155. In the illustrated embodiment, the removable pipe holder 155 is attached to the training bay 103 at a bottom portion of the left (relative to the orientation shown in the figure) open storage section 179. In some embodiments, a removable pipe holder 155 may be provided at a bottom portion of the right (relative to the orientation shown in the figure) open storage section 179 in addition to or in place of the illustrated removable pipe holder 155. The removable pipe holders 155 may be configured to hold pipes in a vertical orientation or in other orientations. As an example, during training or testing, a gas technician may plumb between a mock service line positioned on the ground (or on holders) in front of the training bay 103 and the mock service entrance 143. The pipes used may be supported by the one or more removable pipe holders 155. While FIG. 7 illustrates one pipe holder 155, other numbers may be used, including one, two, three or more pipe holder 155.

Figure 8:
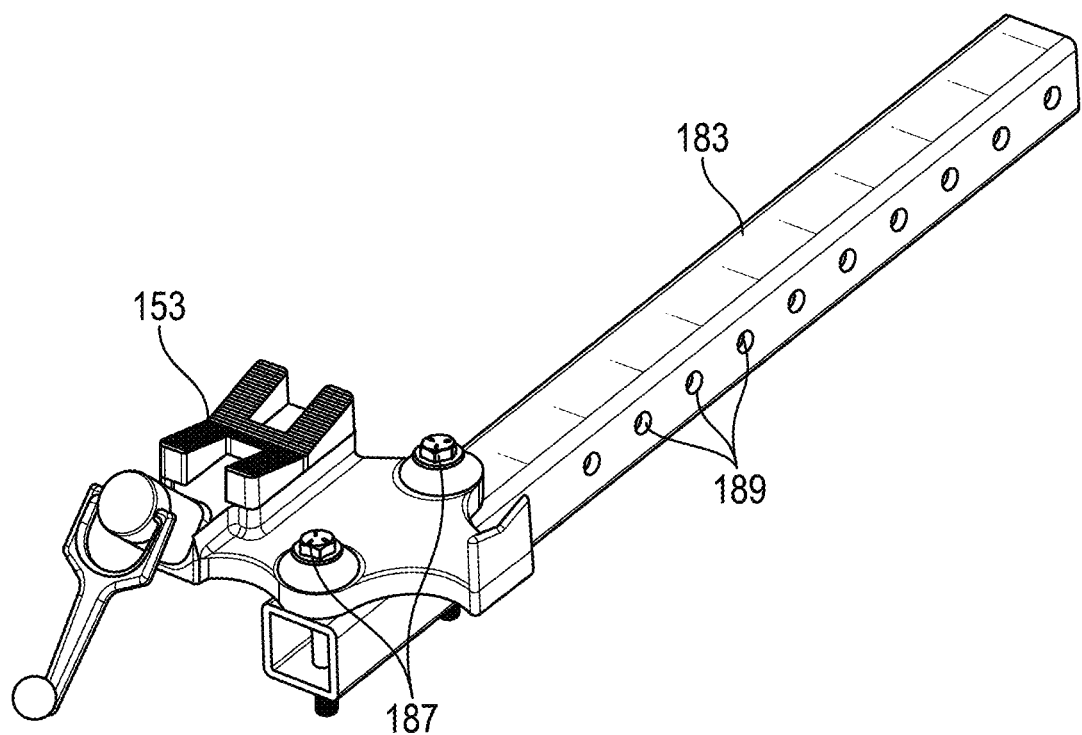
FIG. 8 is a perspective view of an embodiment of a pipe vice.

FIG. 8 is a perspective view of an embodiment of a pipe vice 153 that can be configured for use the training bays 103 as described herein. In the illustrated embodiment, the pipe vice 153 comprises a chain pipe vice. A chain pipe vice may be advantageous due to its relatively low profile. Still, other types of pipe vices can be used in other embodiments. In some embodiments, the pipe vice 153 is configured for use with pipes having diameters of different sizes. For example, the pipe vice can be configured for use with pipes having diameters between ⅛ inch and 6 inches or larger, for example, up to 8 inches.

As illustrated in FIG. 8, the pipe vice 153 can be mounted on or attached to an elongated member, such as a post 183. In the illustrated embodiment, the pipe vice 153 is attached to the post 183 using mechanical fasteners, such as bolts 187. Other connection methods and devices can also be used to secure the pipe vice 153 to the post 183. As will be described more fully below, the post 183 can be used to removably attach the pipe vice 153 to the training bay 103. For example, the post 183 can be configured to be received within the channel 185 shown in FIG. 9. In the illustrated embodiment, the post 183 comprises a length of square tubing. Other elongated members can also be used. In some embodiments, the shape or profile of the post 183 should be selected so that it can be received within the channel 185. Further, in some embodiments, the fit between the post 183 and the channel 185 should be tight enough to prevent unnecessary play, while still allowing the post 183 to easily slide within the channel 185.

Additionally, in the illustrated embodiment, the post 183 includes a plurality of apertures 189 along its length. The apertures 189 can be configured to selectively engage with a latch device 191 (as shown, for example, in FIG. 10) to secure post 183 within the channel 185. Moreover, the different apertures 189 allow the post 183 to be secured at different points so that the distance that the pipe vice 153 extends from the training bay 103 can be adjusted as desired. In some embodiments, the length of the post 183 is at most, at least or about 12 inches, 16 inches, 18 inches, 20 inches, 24 inches, 28 inches, 30 inches, 32 inches, 36 inches, 40 inches or more. Apertures 189 can be 1 inch, 1.5 inches, 2 inches, 2.5 inches, 3 inches, 3.5 inches, 4 inches, 4.5 inches, 5 inches, 5.5 inches, 6 inches or more apart. It will be appreciated that the length of the post 183 contributes to how much extension of the pipe vice 153 will be available and the spacing of the apertures 189 contributes to the granularity with which the extension of the pipe vice 153 can be adjusted.

Figure 9:
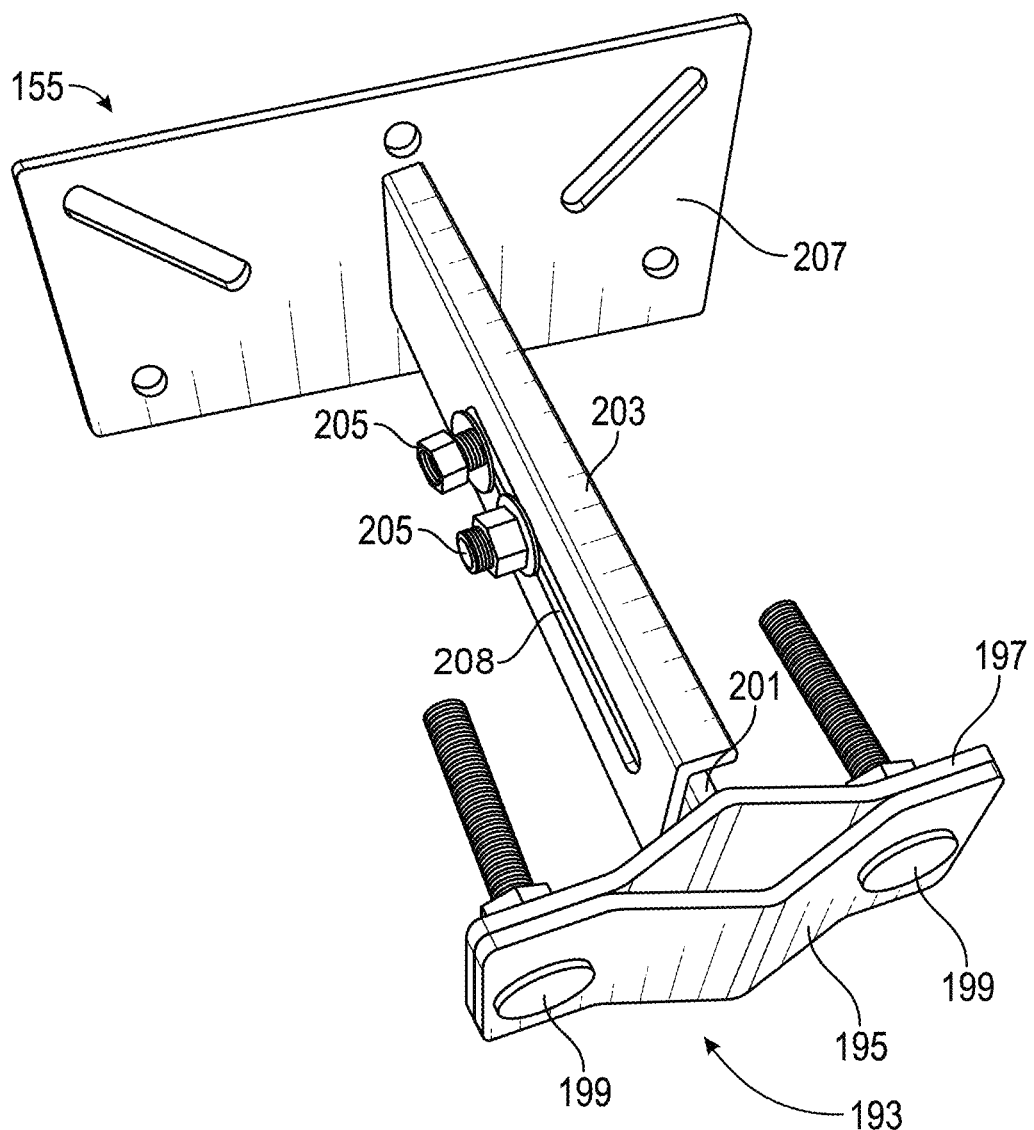
FIG. 9 is a perspective view of an embodiment of a pipe holder.

FIG. 9 is a perspective view of an embodiment of the pipe holder 155 that can be configured for use the training bays 103 as described herein. In the illustrated embodiment, the pipe holder 155 comprises a clamp 193. The clamp 193 may comprise a first clamping member 195 and a second clamping member 197. The clamp 193 can be configured to secure a pipe between the first and second clamping members 195, 197. Accordingly, the first and second clamping members 195, 197 may comprise plates having an angled profile (e.g., as shown). Other shapes are also possible. In the illustrated embodiment, the first and second clamping members 195, 197 are connected to each other by mechanical fasteners, such as the bolts 199. During use, nuts on the bolts 199 may be loosened allowing the first and second clamping members 195, 197 to move apart. Once the pipe is inserted, the nuts can be tightened, bringing the first and second clamping members 195, 197 back together and securing the pipe. In some embodiments, the pipe holder 155 is configured for use with pipes having diameters of different sizes. For example, the pipe vice can be configured for use with pipes having diameters between ⅛ inch and 3 inches, or larger.

As shown in FIG. 9, the clamp 193 can be attached to a first extension member 201. In the illustrated embodiment, the first extension member 201 comprises a bar with a rectangular cross-section, although this need not be limiting, and the first extension member 201 may comprise other cross-sectional profiles. The first extension member 201 can be telescoping engaged with a second extension member 203. The telescoping connection can allow the first extension member 201 to slide relative to the second extension member 203 to adjust the overall length of the pipe holder 155. In the illustrated embodiment, the second extension member 203 comprises a length of C-channel. The first extension member 201 can be received within the "C" of the C-channel of the second extension member 203. As shown in FIG. 9, the second extension member 203 can include a slot 208 formed therein. Fasteners 205 that connect the first extension member 201 to the second extension member 203 can be positioned through the slot 208. To adjust the relative position of the first extension member 201 and the second extension member 203, the fasteners can be loosened, allowing them to slide within the slot 208. The first extension member 201 can be moved to a new position relative to the second extension member 203, and the fasteners 205 can be retightened to secure the first extension member 201.

In some embodiments, the pipe holder 155 comprises a length that is adjustable between about 6 inches and about 9 inches, 12 inches, 14 inches, 16 inches, or more. In some embodiments, the length of the pipe holder 155 need not be adjustable. For example, the first and second extension members 201, 203 could be replaced with a single, fixed length extension member.

As shown in FIG. 9, opposite the clamp 193, the pipe holder 155 includes a plate 207. Specifically, in the illustrated embodiment, the plate 207 is attached to the second extension member 203. The plate 207 is configured to allow the pipe holder 155 to removably attach to the training bay 103. For example, the plate 207 can be configured to slidingly received within a slotted receptacle 209 as shown in FIG. 10 and as will be described in more detail below.

Figure 10:
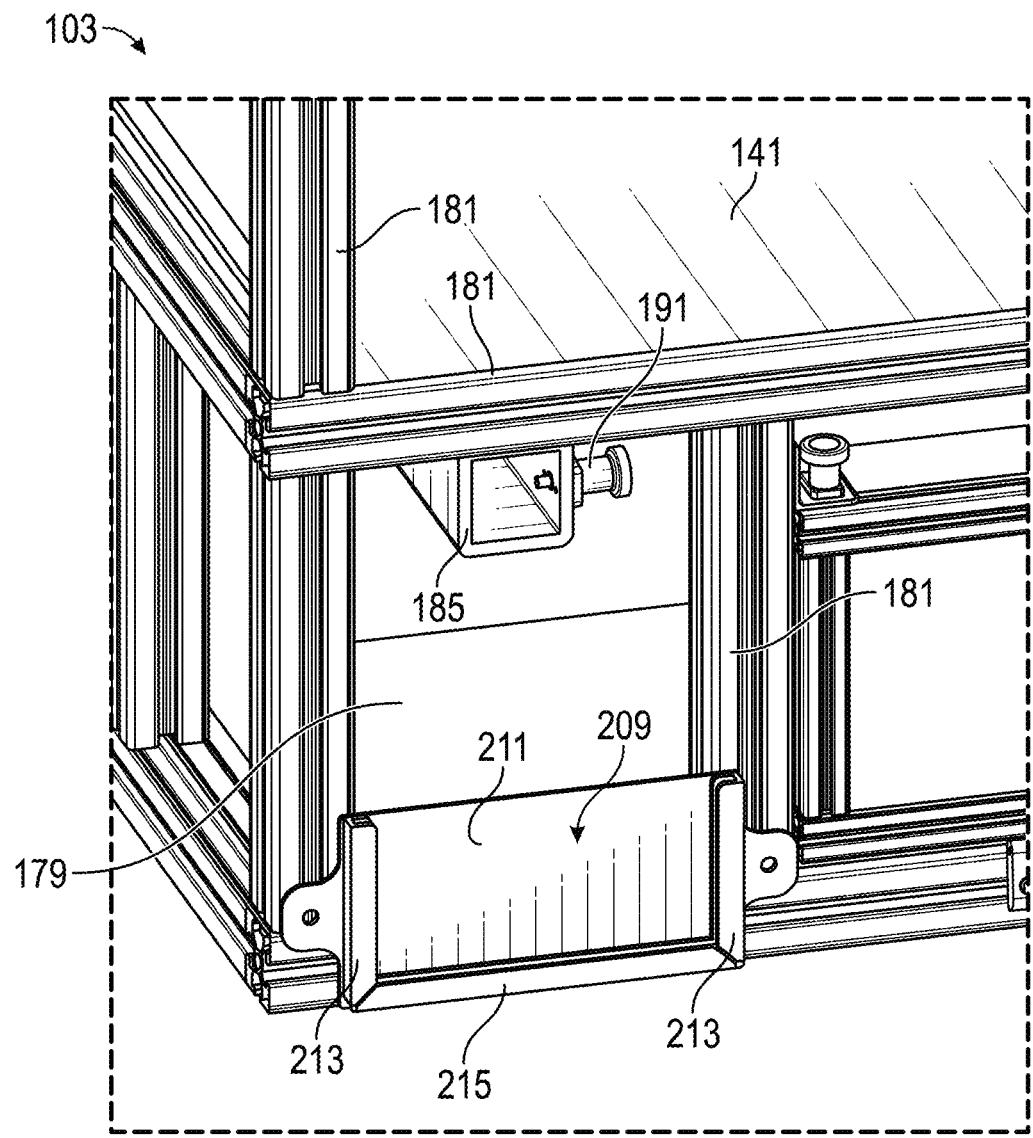
FIG. 10 illustrates an enlarged view of a portion of the training bay of FIG. 7 with the pipe vice and pipe holder uncoupled from the training bay.

FIG. 10 illustrates an enlarged view of a portion of the training bay 103 of FIG. 8 with the pipe vice 153 and pipe holder 155 uncoupled therefrom. In particular, FIG. 8 illustrates the left open storage section 179. As shown, the training bay 103 can include the channel 185 and the slotted receptacle 209. The channel 185 can be configured to receive the post 183 to removably couple the pipe vice 153 to the training bay 103. The slotted receptacle 209 can be configured to receive the plate 207 to removably couple the pipe holder 155 to the training bay 103.

As shown in FIG. 10, the channel 185 can comprise a length of square tubing, although other shapes can be used. As noted above, the shape or profile of the channel 185 should be selected such that it can slidingly receive the post 183 therein. Further, in some embodiments, the fit between the post 183 and the channel 185 should be tight enough to prevent unnecessary play, while still allowing the post 183 to easily slide within the channel 185. The channel 185 can be connected to the frame 181. In the illustrated embodiment, the channel 185 is connected to the frame 181 just below the work bench 141, although other locations are also possible. As illustrated, a latch device 191 can be provided to engage with the apertures 189 of the post 184 (see FIG. 8). In the illustrated embodiment, the latch device 191 comprises a spring-biased rod attached to a handle. Other types of latch devices 191 can also be used.

In the illustrated embodiment, the slotted receptacle 209 is also attached to the frame 181. As illustrated, the slotted receptacle 209 is positioned near a bottom portion of the open storage section 179, but other locations for the slotted receptacle are also possible. The slotted receptacle 209 can include an open top side 211, slotted lateral sides 213, and a slotted bottom sides 215. The slotted lateral sides 213 and the slotted bottom sides 215 can be configured as open channels configured to receive edges of the plate 207 as shown in FIG. 11.

Figure 11:
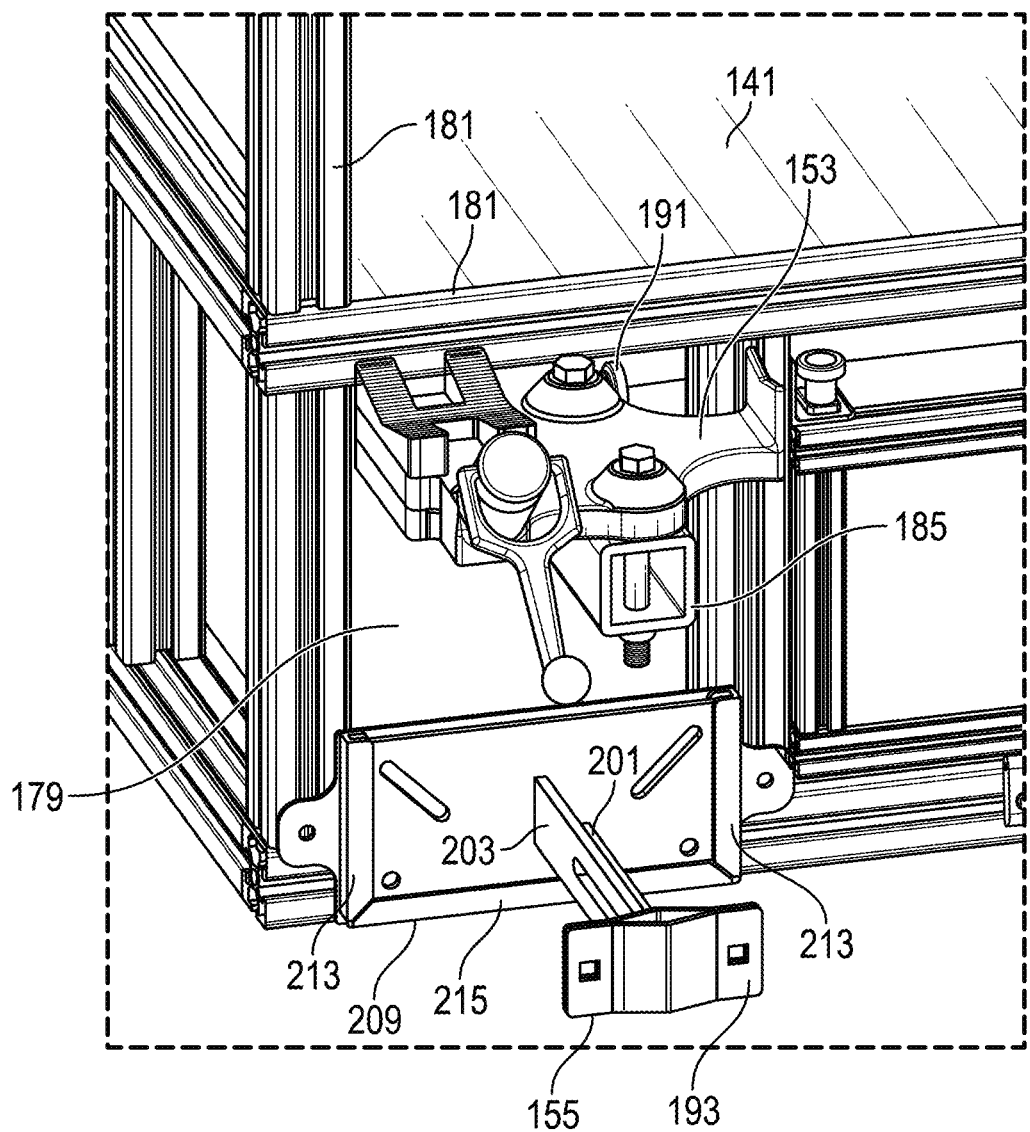
FIG. 11 illustrates an enlarged view of a portion of the training bay of FIG. 7 with the pipe vice and the pipe holder removably coupled to the training bay.

FIG. 11 illustrates the enlarged view of FIG. 10 with the pipe vice 153 and the pipe holder 155 removably coupled to the training bay 103. As shown, the post 183 attached to the pipe vice 153 is received within the channel 185 and secured by the latch device 191. By varying which aperture 189 is engaged with the latch device 191 the extension of the pipe vice 153 away from the training bay 103 can be adjusted. Similarly, FIG. 11 illustrates the plate 207 received within the slotted receptacle 209 to secure the pipe holder 155 to the training bay 103. The plate 207 can be inserted into the slotted receptacle by sliding it downward such that the edges of the plate are captured by the slotted lateral sides 213 and the slotted bottom sides 215.

The mechanisms described above for removably mounting the pipe vices 153 and pipe holders 155 to the training bays 103 are provided by way of example. Other mechanisms may be used in other embodiments.

Figure 12:
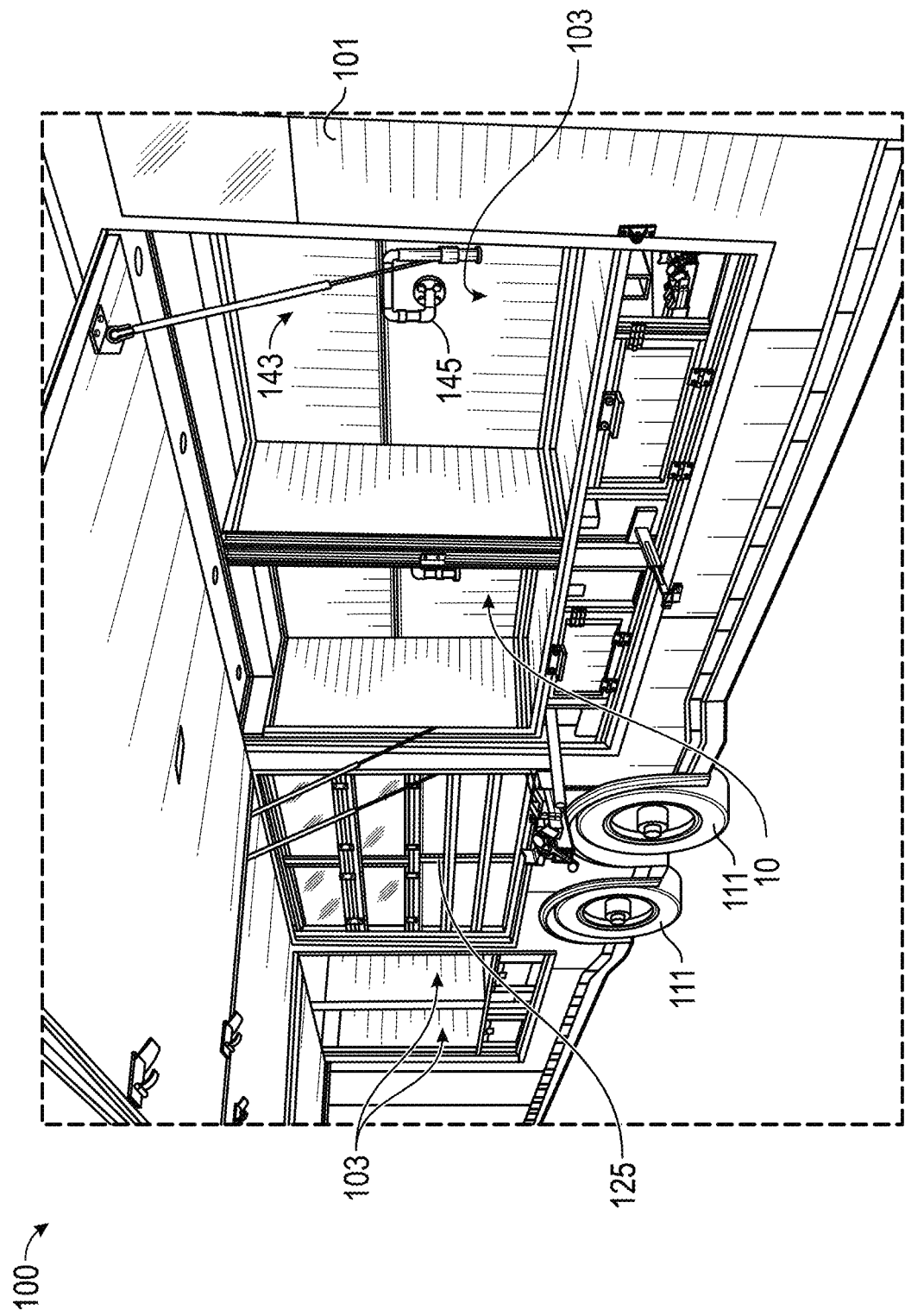
FIG. 12 is a perspective view of the mobile training lab of FIG. 1, illustrating four training bays and an exterior storage area.

FIG. 12 is a perspective view of the mobile training lab 100, illustrating four training bays 103 and the exterior storage area 125 on one side of the trailer 101 according to an embodiment. As shown in the illustrated embodiment, the four training bays 103 on one side of the trailer 101 can be grouped into pairs, with one pair on each side of the wheels 111. The external storage area 125 described above is provided over the wheels 111. This configuration may be advantageous as it can allow the training bays 103 to be larger since the training bays 103 themselves do not need to allocate space to accommodate the wheels 111 and wheel wells of the trailer 101. Other configurations with training bays 103 positioned over the wheels 111 are also possible.

Figure 13:
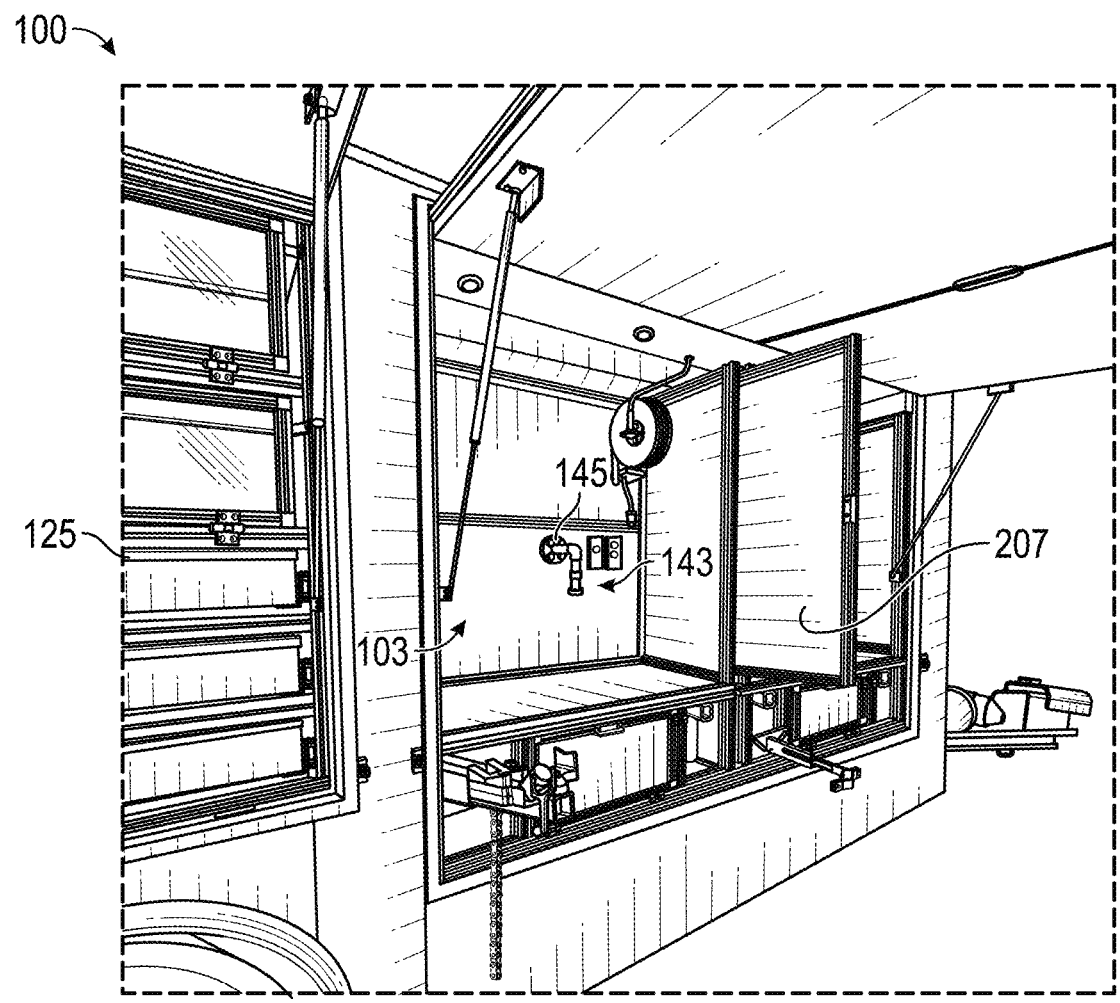
FIG. 13 is a perspective view of the mobile training lab of FIG. 1, illustrating two training bays with an embodiment of a movable partition extended therebetween.

FIG. 13 is a perspective view of the mobile training lab 100, illustrating two training bays 103 with an embodiment of a movable partition 217 extended therebetween. As mentioned above, in some embodiments, training bays 103 can be arranged in pairs that are close together. As the training bays 103 are configured to provide training and/or testing at the bays, it may be desirable to prevent or limit a person working at one training bay 103 from looking into the adjacent training bay 103. Accordingly, a moveable partition 217 can be provided between adjacent training bays 103. The moveable partition 217 can comprise a wall that can be extended between two training bays 103. FIG. 13 illustrates the moveable partition 217 in an extended position. FIG. 5, for example, shows a similar view of the mobile training lab 100 with the moveable partition 217 in a retracted position (and thus not visible in FIG. 5). In some embodiments, the moveable partition 217 can be configured to extend at least or about 1 foot, 1.5. feet, 2 feet, 2.5 feet, 3 feet, 3.5 feet, or more. The moveable partition 217 can include a writeable surface, such that it can be used for notes as described above.

FIGS. 12 and 13 also illustrate that, in some embodiments, the mock service entrances 143 of different training bays 103 can be differently arranged. As used herein, "differently arranged" means that at least one aspect of a mock service entrance 143 is different than a corresponding aspect of another mock service entrance 143. For example, the mock service entrance 143 of one training bay 103 (e.g., that shown in FIG. 12) may be at a different location than the corresponding location of the mock service entrance 143 of another training bay 103 (e.g., that shown in FIG. 13). As an example, the mock service entrance 143 of the training bay visible in FIG. 12 extends from the rear wall at a position that is lower than the mock service entrance 143 of the training bay visible in FIG. 13. Additionally, the gas connection point 145 of the mock service entrance 143 of the training bay visible in FIG. 12 includes a different arrangement of pipes (e.g., different lengths, bends, etc.) than the gas connection point 145 of the mock service entrance 143 of the training bay visible in FIG. 13.

Providing training bays 103 with differently arranged mock service entrances 143 can provide different training and/or testing situations. Further, providing training bays 103 with differently arranged mock service entrances 143 can be helpful in preventing copying or cheating during training as each mock service entrance 143 can be unique.

Figure 14:
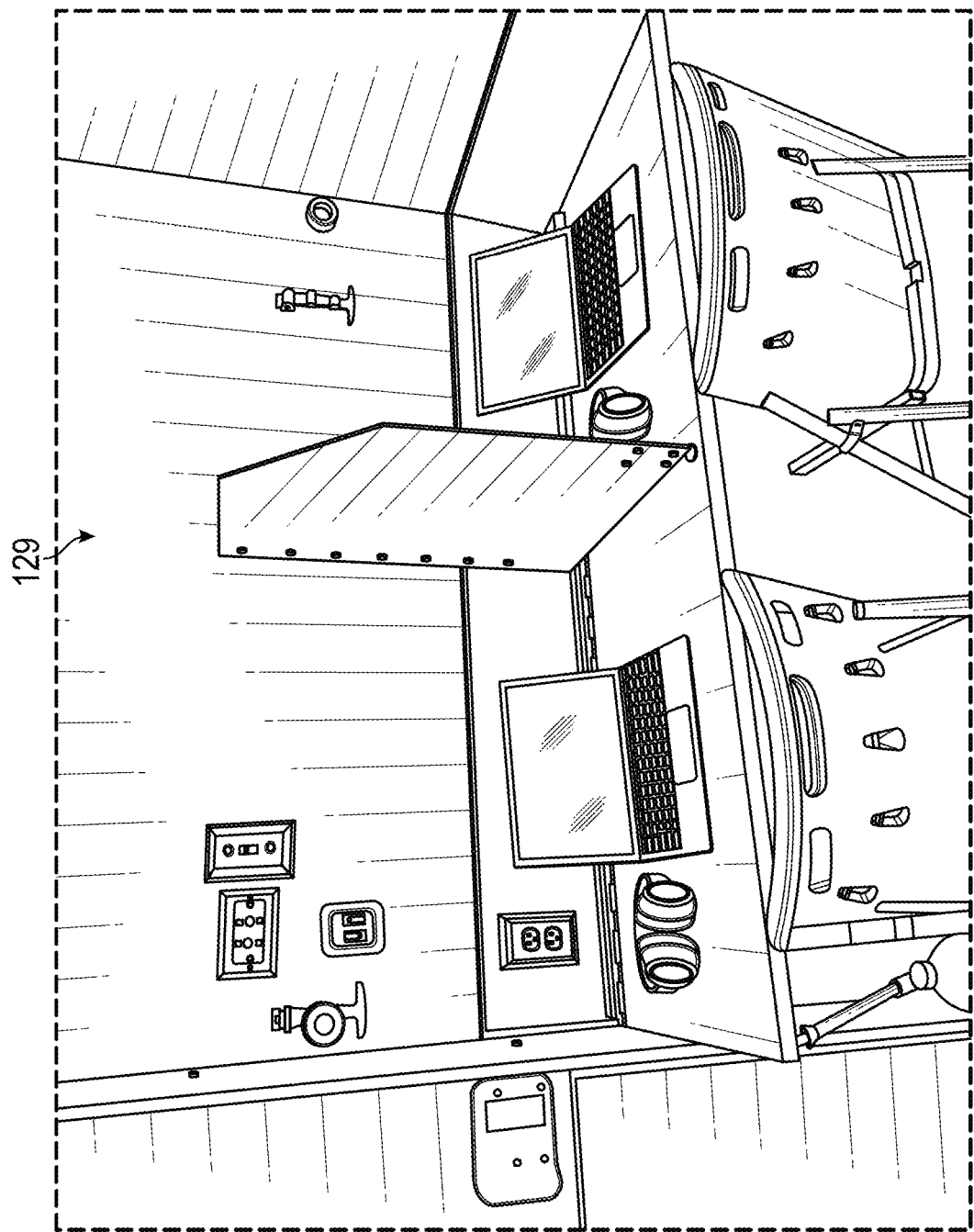
FIG. 14 is a perspective view illustrating a classroom of the mobile training lab of FIG. 1, according to an embodiment.

FIG. 14 is a perspective view illustrating an embodiment of the classroom 129 of the mobile training lab 100, according to an embodiment. The classroom 129 can be configured to provide a space for written or computer-based testing and/or training. In some embodiments, the classroom 129 is configured with tables and chairs. In some embodiments, the tables and chairs are fixedly connected to the trailer 101; however, this need not be the case in all embodiments. The classroom 129 may further include one or more computers or laptops for computer based-training or testing. The classroom 129 may also be configured with a wireless internet connection. In some embodiments, the classroom 129 is configured with at least two different wireless internet connections so as to provide a backup in case of failure.

Figure 15:
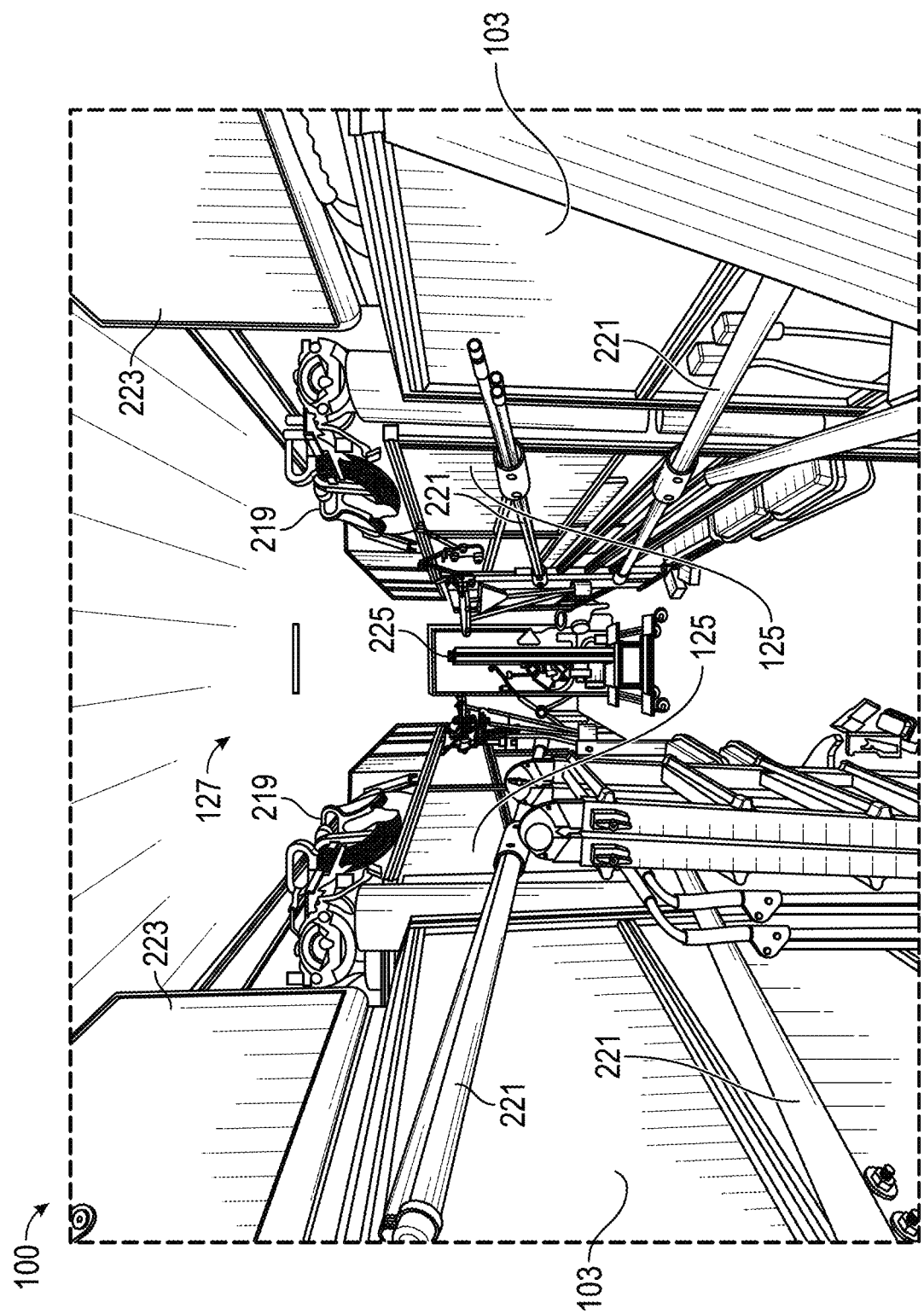
FIG. 15 is a perspective views of an interior storage area of the mobile training lab of FIG. 1.

FIG. 15 is a perspective views of an embodiment of the interior storage area 127 of the mobile training lab 100. As noted previously, the interior storage area 127 may be provided in the hollow interior 109 of the trailer 101 in the space between the training bays 103 and the external storage areas 125. As shown in FIG. 15, the interior storage area 127 can be configured as a corridor between the training bays 103 and the external storage areas 125 on the opposite sides of the mobile training lab 100. The interior storage area 127 can be configured for storage of at least some of the items used during training and/or testing with the mobile training lab 100. In some embodiments, the mobile training lab 100 is generally self-contained in that the item need to use the mobile training lab 100 are provided on and stored in the mobile training lab 100, such as within the interior storage area 127.

Figure 16:
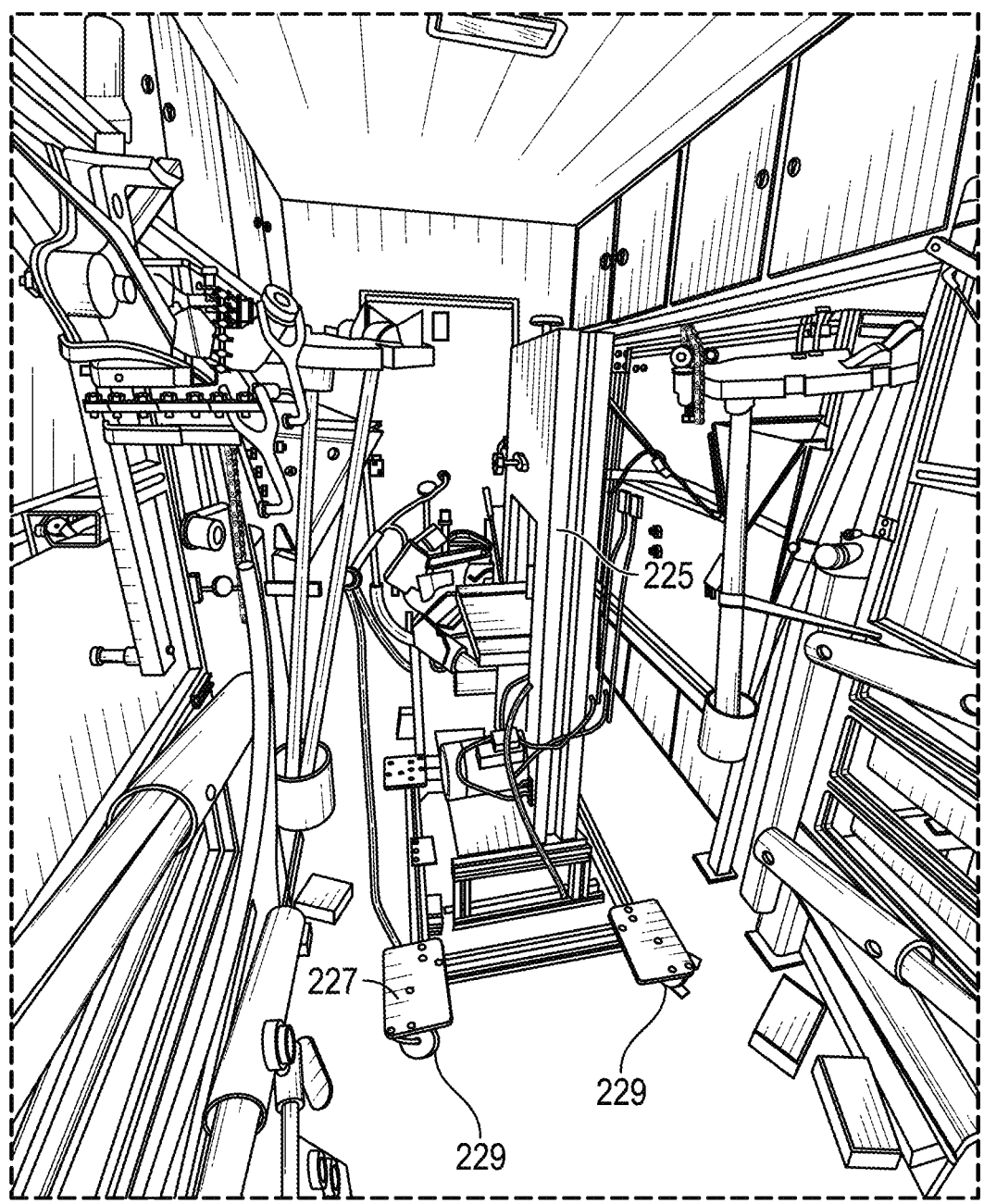
FIG. 16 illustrates a perspective view of a movable band saw configured for use with a mobile training lab.

As shown in FIG. 15, the interior storage area 127 can be configured for storage of, for example, pipe fusion machines 219 and pipe 221. The interior storage area 127 can also include cabinets 223 for more storage. In some embodiments, gas meters can be stored in the cabinets 223 or elsewhere in the mobile training lab 100. FIG. 16 also illustrates that a portable band saw 225 can be stored in the interior storage area 127. The portable band saw 225 is described in more detail below with reference to FIG. 16.

FIG. 16 illustrates a perspective view of an embodiment of the portable or movable band saw 225 configured for use with a mobile training lab 100. In some instances, the band saw 225 may be used for destructive testing of fusions or welds performed by gas technicians using the mobile training lab 100. As shown in FIG. 16, the band saw 225 can be mounted on a frame 227 comprising wheels so that the band saw 225 can easily be moved out of the interior storage area 127 for use.

Figure 17:
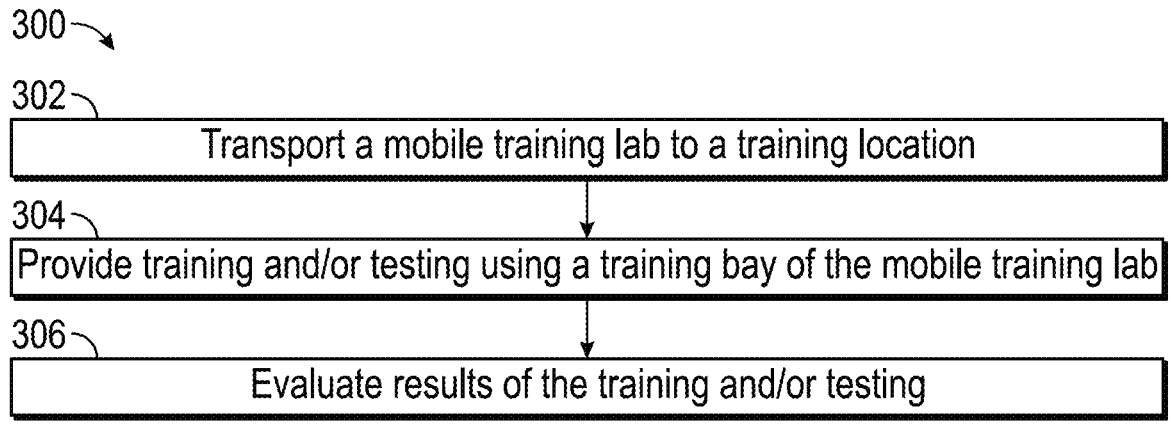
FIG. 17 is a flow chart illustrating a method for training gas technicians.

FIG. 17 is a flow chart illustrating a method 300 for training gas technicians. The method 300 can be implemented using the mobile training lab 100 described above. As shown in FIG. 17, the method 300 can begin at block 302, at which a mobile training lab 100 is transported to a testing location. In some embodiments, transporting the mobile training lab 100 to a testing location comprises towing the mobile training lab 100 behind another vehicle. In some embodiments, the testing location can comprise a worksite. Once at the training location, the mobile lab 100 can be set up for training and or testing. An example set up method is described below with reference to FIG. 18.

Next, at block 304, training and/or testing can be provided using at least one training bay 103 of the mobile training lab 100. Various types of training and or testing can be provided using the mobile training lab 100, including one or more of the following:

Main installation including pressure testing;
Running service lines off of main including tapping and pressure testing;
MSA construction including leak, lock and flow testing;
Customer fuel line assembly including pressure testing;
Fusion destructive testing;
Classroom training and testing;
Steel tapping and stopping training;
Fusion training up to 8 in diameter (or larger);
Operator Qualification certification;
Locating training;
Corrosion and cathodic protection;
Purging of mains and services with or without inert gas injection; and
Gas relight training and testing.

Finally, at block 306 the results of the training and or testing can be evaluated. In some embodiments, evaluating the test results comprises performing destructive testing of a fusion weld using the portable band saw 225. Other types of evaluations can also be performed.

Figure 18:
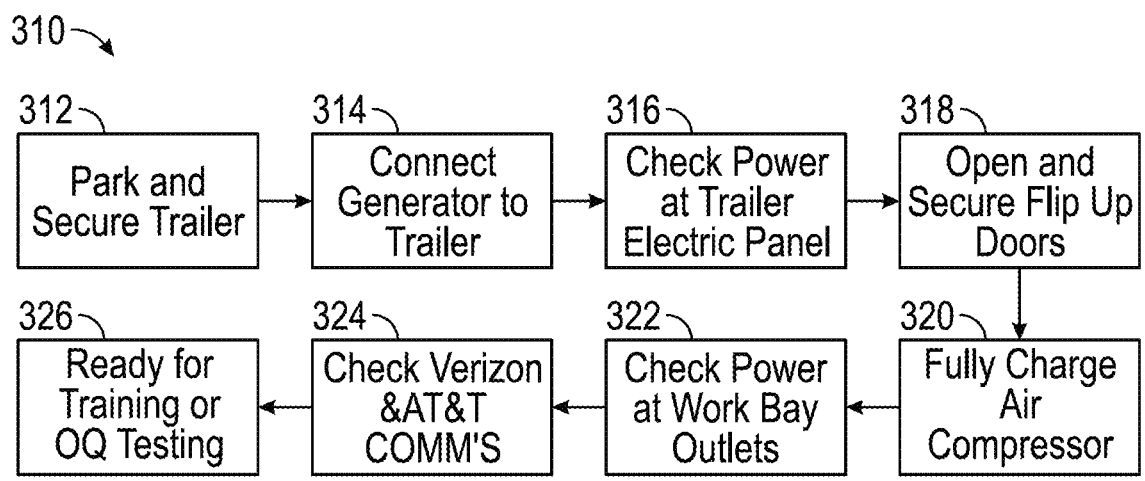
FIG. 18 is a flow chart illustrating a method for setting up a mobile training lab.

FIG. 18 illustrates an example set up method 310 for the mobile training lab 100. At block 312, the mobile training lab 100 can be parked and secured. At block 314, the mobile training lab 100 can be connected to a generator to provide power to the mobile training lab 100. At block 316, the power can be checked at an electrical panel of the mobile training lab 100. At block 318, the doors can be opened to provide access to the training bays 103. At block 320, the air compressor 135 can be charged. At block 322, the power sources at each training bay 103 can be checked. At block 324, the redundant wireless internet connections can be checked. At block 326, the mobile training lab 100 is now ready for training and or testing.

Figure 19:
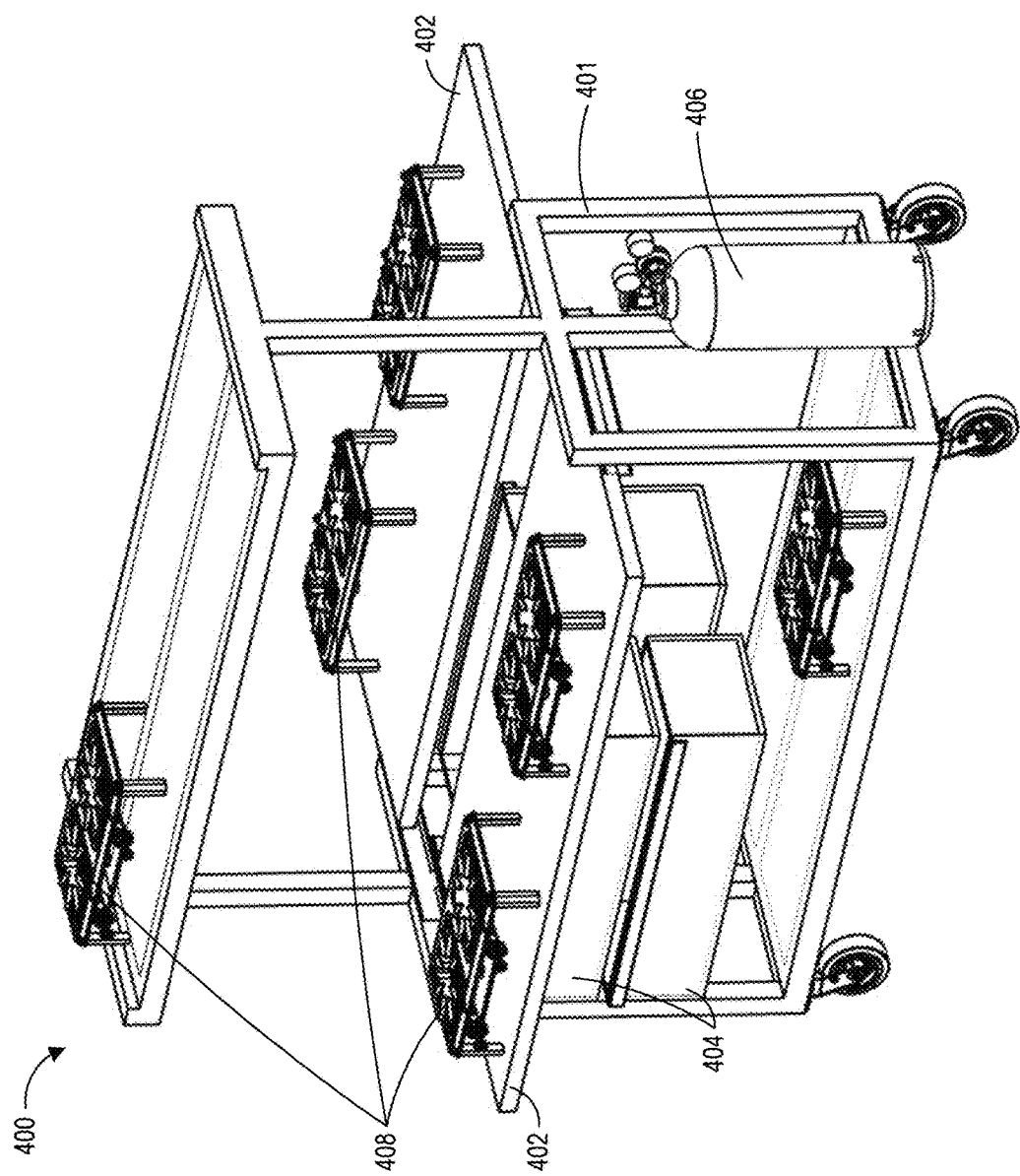
FIG. 19 illustrates a perspective view of an embodiment of a gas relight station configured for use with a mobile training lab.

FIG. 19 illustrates an embodiment of a gas relight station 400 that can be configured for use with the mobile training lab 100. The gas relight station 400 can be configured to be used during training and/or testing of gas technicians related to relighting gas burners, pilot lights, etc. In the illustrated embodiment, the gas relight station 400 comprises a mobile cart 401 that includes one or more tables 402, storage areas 404, a gas supply 406, and gas burners 408. Not all components need be included in all embodiments. The illustrated embodiment of the gas relight station 400 is provided by way of example and other arrangements and configurations for the gas relight station 400 are also possible. For example, while illustrated as a mobile cart 401, in other embodiments, one or more aspects of the gas relight station can be integrated directly into the one or more training bays 103 of the mobile training lab 100.

In the illustrated embodiment, the gas relight station 400 is configured as a mobile cart 401. The mobile cart 401 can include one or more wheels or casters such that the gas relight station 400 can be easily moved. For example, the gas relight station 400 can be configured to be moved from a storage location (e.g., within one of the storage areas of the mobile training lab 100) to a training or testing location (e.g., outside of the mobile training lab 100). In some embodiments, the mobile cart 401 is configured in size and shape such that it can be stored within the internal storage area 127 as shown in FIGS. 2, 3, 4, and 15, for example.

The mobile cart 401 can comprise a frame configured to support one or more additional features of the gas relight station 400. For example, the frame of the mobile cart 401 can support one or more work surfaces or tables 402 as well as one or more storage areas 404. In the illustrated embodiment, the work surfaces or tables 402 provide surfaces on which to work. As shown, the tables 402 can support one or more gas burners 408 configured for use during training and or testing. In some embodiments, the tables 402 can be mounted on rails such that they can be extended outwardly from the frame of the mobile cart 401. This can increase the usable space of the tables 402, while also allowing the tables 402 to collapse down into a smaller size so as to facilitate storage of the gas relight station 400 (for example, within the internal storage area 127, which may have a limited width).

Additionally, the mobile cart 401 can include one or more storage areas 404. In the illustrated embodiment, the storage areas 404 include surfaces or shelves that are positioned above and below the tables 402. Additionally, in the illustrated embodiment, the storage areas 404 include one or more cabinets or drawers positioned below the tables 402. Other placements and configurations for the storage areas 404 are also possible. The storage areas 404 can be configured for storage of the gas burners 408 as well as tools and other consumables used during training and testing.

As shown in FIG. 19, the gas relight station can include a gas supply 406. The gas supply 406 can be a tank storing gas. The gas supply 406 can be fluidly connectable to the one or more gas burners 408 so as to supply the gas burners 408 with gas during training and or testing. In the illustrated embodiment, the gas supply 406 is mounted on the mobile cart 401, although other locations for the gas supply 406 are possible.

Figure 20:
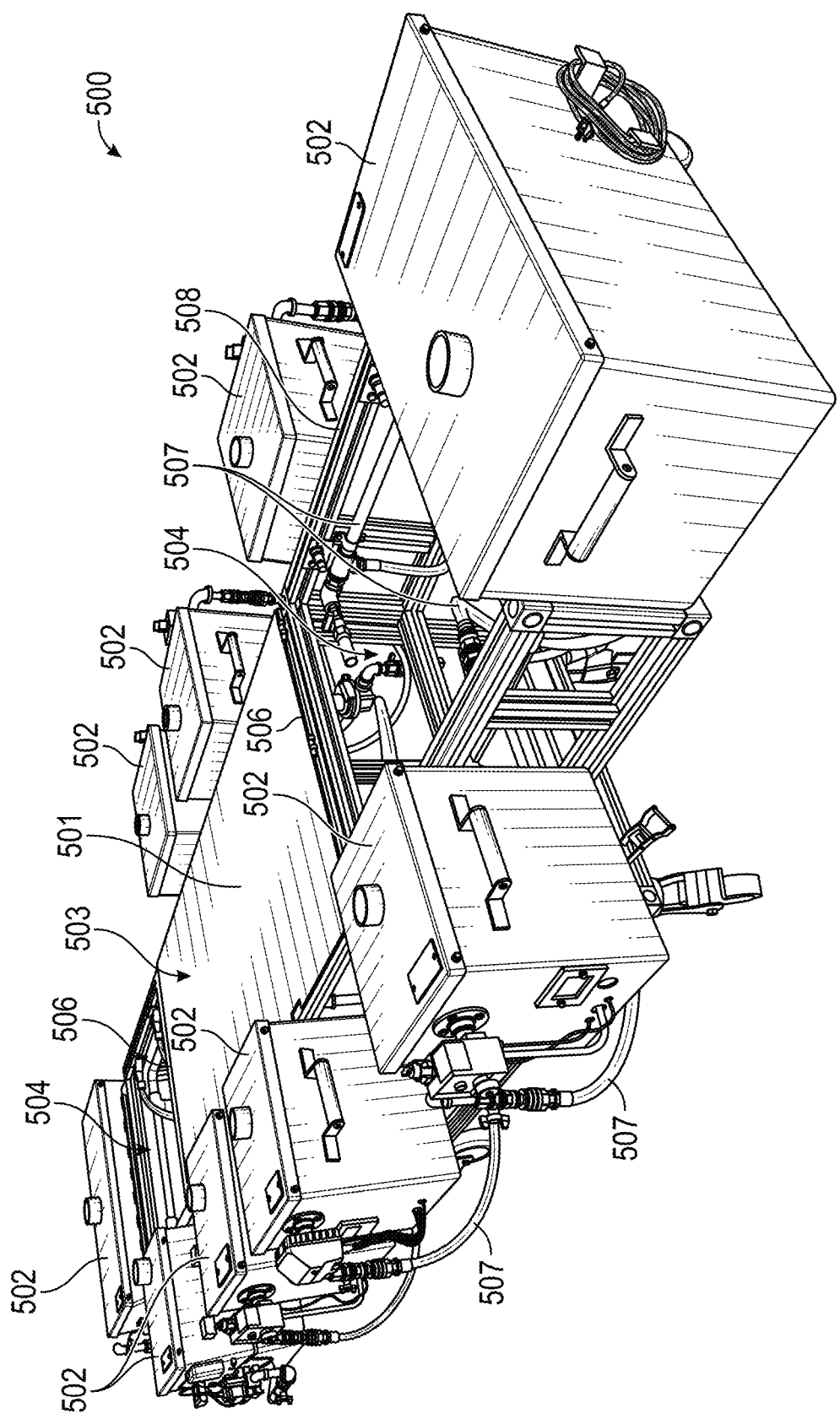
FIG. 20 is a perspective view of another embodiment of a gas relight station that can be configured for use with a mobile training lab.
Figure 21:
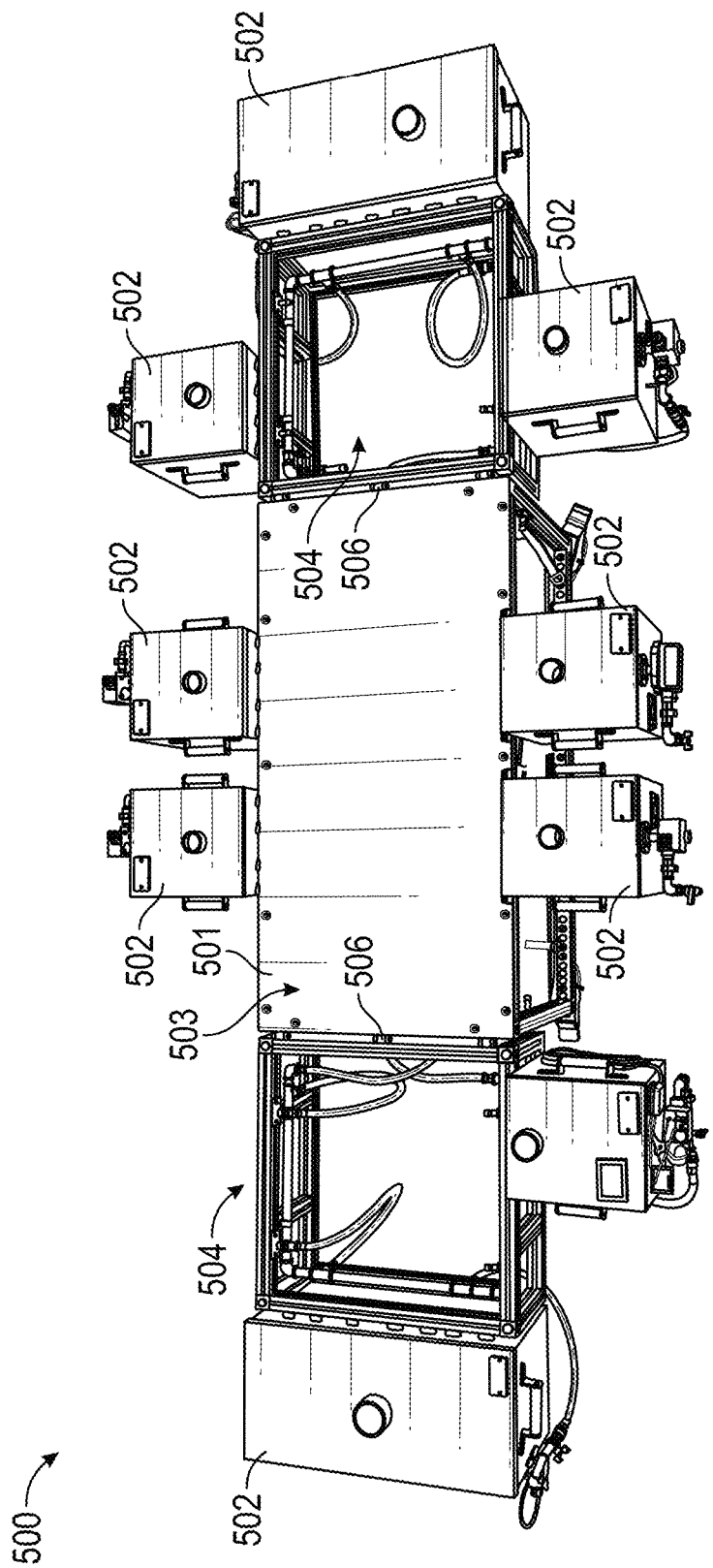
FIG. 21 is an overhead view of the gas relight station of FIG. 20.
Figure 22:
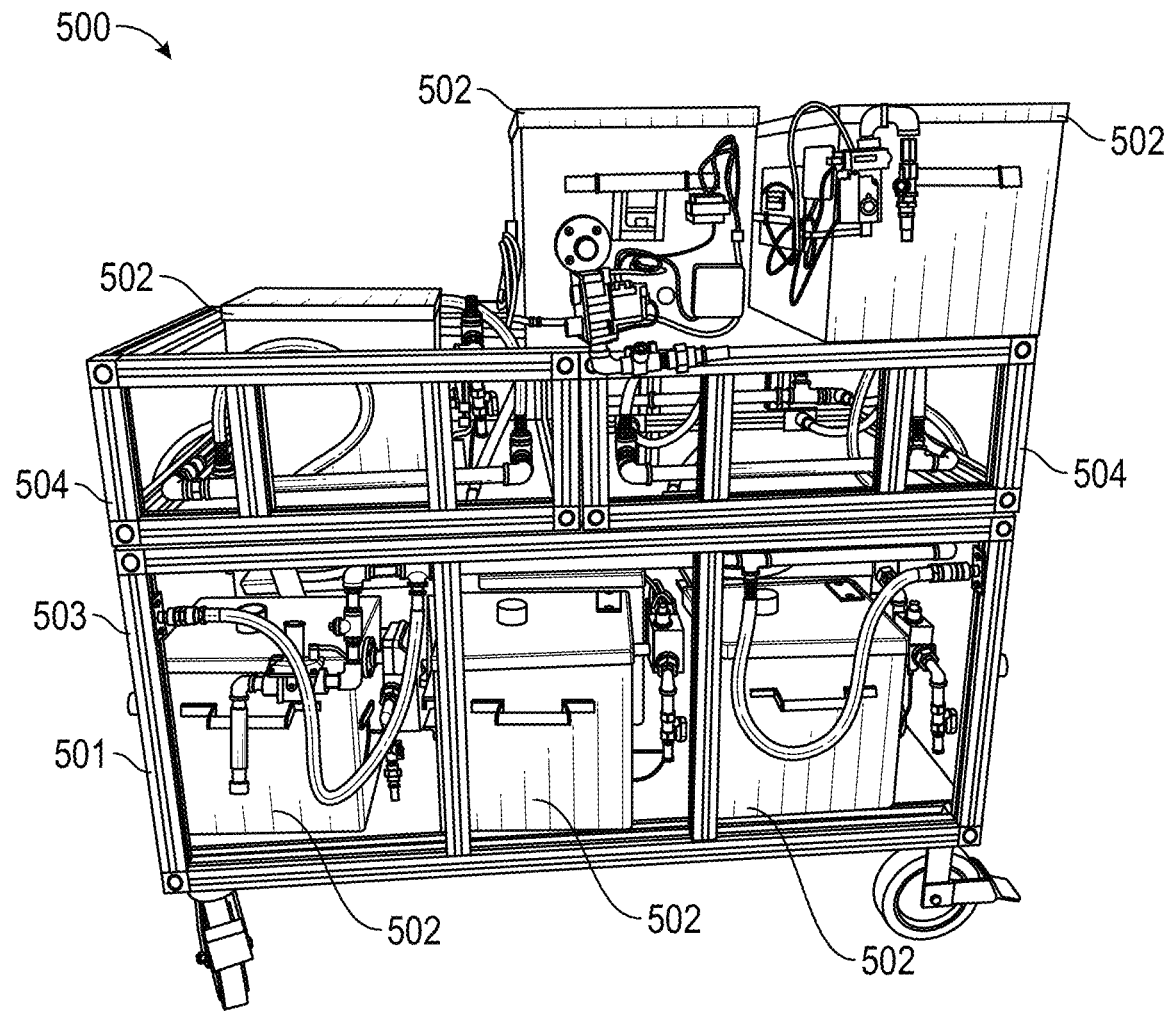
FIG. 22 is a front view of the gas relight station of FIG. 20, illustrated in an example storage configuration.

FIGS. 20-22 illustrate another embodiment of a gas relight station 500. In some respects similar to the gas relight station 400 shown in FIG. 19, the gas relight station 500 of FIGS. 20-22 can be configured to be used during training and/or testing of gas technicians related to relighting gas burners, pilot lights, etc. In some embodiments, the gas relight station 500 can be used in conjunction with a mobile training lab 100. For example, the gas relight station 500 can be stored within the internal storage area 127 of the mobile training lab 100 and moved outside of the mobile training lab 100 during use. FIG. 20 is a perspective view of the a gas relight station 500, FIG. 21 is an overhead view of the gas relight station 500, and FIG. 22 is a front view of the gas relight station 500, illustrated in an example storage configuration.

Figure 23:
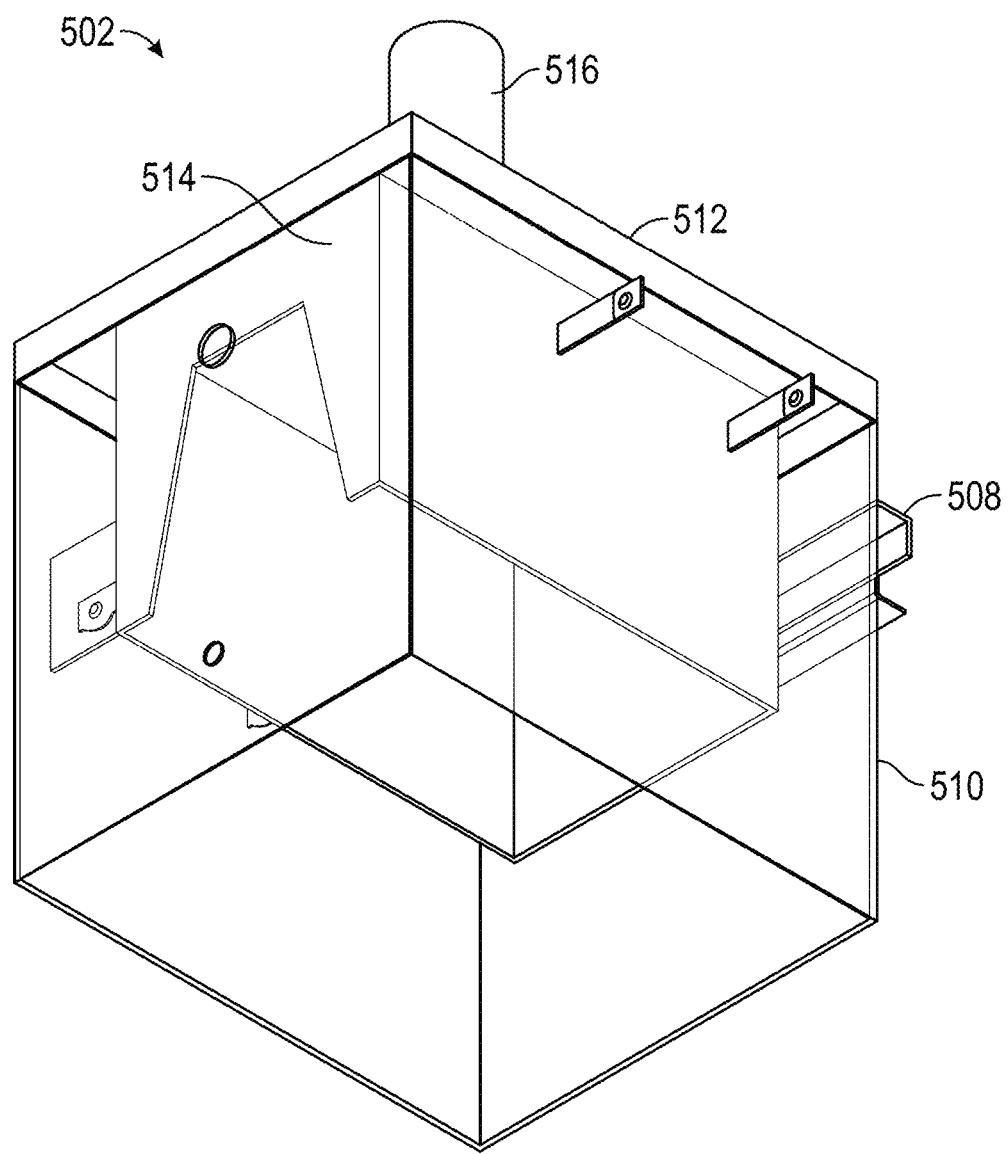
FIG. 23 illustrates an embodiment of a burner enclosure of the gas relight station of FIG. 20.

As shown in FIGS. 20-22, the gas relight station 500 may comprise a mobile cart 501. The mobile cart 501 can include one or more wheels or casters. The mobile cart 501 can comprise a frame configured to support one or more additional features of the gas relight station 500. In the illustrated embodiment, the frame of the gas relight station 500 comprises T-slot frame members. Use of T-slot frame members may facilitate attachment of various components of the gas relight station 500 to the frame. For example, as shown in FIGS. 20 and 21, one or more burner boxes or enclosures 502 (an example of which is shown in FIG. 23, described below) can be attached to the T-slot frame members. Other types of frame components may also be used.

In the illustrated embodiment, the gas relight station 500 may be configured to transition between a deployed configuration (as shown, for example, in FIGS. 20 and 21) and a storage configuration (as shown, for example, in FIG. 22). As shown, the gas relight station 500 may comprise a main portion 503 and two extension portions 504 positioned on opposite ends of the main portion 503. The extension portions 504 can be attached to the main portion 503 by hinges 506 that allow the extension portions 504 to move between the deployed configuration and the storage configuration. As shown in FIG. 22, for some embodiments, in the storage configuration, the extension portions 504 can rotate about the hinges 506 to be positioned on top of the main portion 503. This can greatly decrease the footprint of the gas relight station 500 for storage.

The gas relight station 500 can include multiple gas lines 507 plumbed throughout the mobile cart 501. The gas lines 507 can connect to a gas source, such as a gas tank on the mobile cart 501 or elsewhere, and extend to various locations on the mobile cart at which the burner enclosures 502 can be attached. The gas lines 507 can be terminated with quick connect connectors so that they can easily be connected to the burner enclosures 502.

As shown in FIGS. 20 and 21, the gas relight station 500 may comprise one or a plurality of burner enclosures 502. An example burner enclosure is also shown in more detail in FIG. 23. In the illustrated embodiment of the gas relight station 500, nine burner enclosures 502 are included, although other numbers of burner enclosures 502 (e.g., one, two, three, four, five, six, seven, eight, nine, ten, or more) can be used in other embodiments. The burner enclosures 502 may comprise a gas burner positioned therein. Each of the enclosures may include various hole locations for air intake and exhaust as well as a window for lighting the burners. Further, each of the enclosures may include a heat shield configured to reduce heat on the outer shell of the enclosure. Some of the burner enclosures 502 may be configured to use electricity to power various electric components, such as electric pilot ignitors, on the burner enclosures 502. The burner enclosures 502 may be configured with different sizes and shapes to provide different training scenarios.

As shown in FIGS. 20 and 21, the burner enclosures 502 may be configured to attach to various locations on the mobile cart 501 of the gas relight station 500. For example, the burner enclosures 502 can attach to the T-slot frame members of the main portion 503 or the T-slot frame members of the extension portions 504. To accomplish this, in some embodiments, each burner enclosure 502 can include a bracket 508 configured to engage with the slot of the T-slot frame members to support the burner enclosure 502. The overhead view of FIG. 21 illustrates various positions at which burner enclosures 502 can be attached. Other positions for the burner enclosures 502 are also possible.

FIG. 22 illustrates the gas relight station 500 in an example storage configuration. As shown, the burner enclosures 502 can be detached from the mobile cart 501 and the extension portions 504 can be folded back on top of the main portion 503. The burner enclosures 502 can then be stored on the mobile cart 501.

FIG. 23 illustrates an example burner enclosure 502 that can be configured for use with the gas relight station 500 of FIGS. 20-22. In the illustrated embodiment, the burner enclosure 502 comprises an outer housing 510. The bracket 508 for connecting the burner enclosure to the gas relight station can be attached to the outer housing as shown. The outer housing 510 is illustrated as transparent so that internal components of the burner enclosure 502 can be illustrated. As shown in FIG. 23, a lid structure 512 can be positioned over the outer housing 510. The lid structure 512 can include an internal heat shield 514 that extends downwardly from the lid structure 512 within the outer housing 510. A gas burner (not shown) can be positioned within the internal heat shield 514. The internal heat shield 514 can be configured to limit transfer of heat to the outer housing 510 of the burner enclosure. An exhaust 516 can be included on the lid structure 512.

From the foregoing description, it will be appreciated that inventive training labs are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A mobile training lab for training gas technicians, the mobile training lab comprising:
    a towable trailer comprising a body having a plurality of walls at least partially defining a hollow interior, an axle having at least two wheels disposed thereon to support the body, and a tow hitch; and
    at least one training bay connected to the towable trailer such that the at least one training bay is configured to be accessed from an exterior of the towable trailer, the at least one training bay comprising:
        a first lateral wall, a second lateral wall, and a rear wall connecting the first and second lateral walls;
        a work bench disposed between the first and second lateral walls and comprising a work surface; and
        a mock service entrance comprising one or more gas connection points positioned on the rear wall of the at least one training bay, wherein the mock service entrance is representative of a commercial or residential gas service entrance.

2. The mobile training lab of claim 1, wherein the at least one training bay further comprises at least one of:
    a power source; and
    a compressed air source.

3. The mobile training lab of claim 1, wherein the at least one training bay comprises at least one removably mounted pipe vice.

4. The mobile training lab of claim 3, wherein:
    the at least one removable pipe vice is mounted on a post; and
    the at least one training bay comprises a channel configured to receive the post to removably mount the pipe vice to the at least one training bay.

5. The mobile training lab of claim 1, wherein the at least one training bay comprises a removably mounted pipe holder.

6. The mobile training lab of claim 5, wherein:
    the removably mounted pipe holder is mounted on a plate; and
    the at least one training bay comprises a slotted receptacle configured to receive the plate to removably mount the pipe holder to the training bay.

7. The mobile training lab of claim 1, wherein:
    the at least one training bay comprises at least a first training bay and a second training bay; and
    a mock service entrance of the first training bay is differently arranged than a mock service entrance of the second training bay.

8. The mobile training lab of claim 7, wherein:
    a gas connection point of the first training bay is positioned at a first location on the rear wall of the first training bay; and
    a gas connection point of the second training bay is positioned at a second location on the rear wall of the second training bay, wherein the second location does not correspond to the first location.

9. The mobile training lab of claim 1, wherein:
    the at least one training bay comprises at least a first training bay and a second training bay positioned adjacent to the first training bay; and
    a moveable partition is configured to extend outwardly between the first training bay and the second training bay.

10. The mobile training lab of claim 9, wherein the moveable partition comprises a whiteboard.

11. The mobile training lab of claim 1, wherein:
    the at least one training bay comprises eight training bays; and
    a first four of the eight training bays are positioned on a first lateral side of the towable trailer and a second four of the eight training bays are positioned on a second lateral side of the towable trailer.

12. The mobile training lab of claim 1, further comprising at least one of:
    a compressor;
    a portable fusion machine; and
    a portable band saw.

13. The mobile training lab of claim 1, wherein the hollow interior of the body comprises a storage area.

14. The mobile training lab of claim 13, wherein the hollow interior of the body further comprises a classroom.

15. The mobile training lab of claim 1, further comprising a gas relight station.

16. The mobile training lab of claim 15, wherein the gas relight station comprises:
    a mobile cart configured to support one or more tables;
    one or more gas burners; and
    a gas supply fluidly connectable to the one or more gas burners.

17. The mobile training lab of claim 16, wherein the one or more tables are mounted on rails such that the one or more tables can extend away from the mobile cart during testing or training and can collapse in toward the mobile cart for storage.

* * * * *